(12) United States Patent
Yun et al.

(10) Patent No.: US 7,868,974 B2
(45) Date of Patent: Jan. 11, 2011

(54) LIQUID CRYSTAL DISPLAY DEVICE

(75) Inventors: Young-Nam Yun, Gunpo-si (KR);
Ji-Hye Moon, Seoul (KR); Myoung-Hi Lee, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 601 days.

(21) Appl. No.: 11/856,542

(22) Filed: Sep. 17, 2007

(65) Prior Publication Data

US 2008/0068533 A1    Mar. 20, 2008

(30) Foreign Application Priority Data

Sep. 19, 2006    (KR) .................... 10-2006-0090563

(51) Int. Cl.
 *G02F 1/1335* (2006.01)
(52) U.S. Cl. .................. 349/106; 349/66; 349/109; 349/113
(58) Field of Classification Search .............. 349/68, 349/106, 109, 113
 See application file for complete search history.

(56) References Cited

U.S. PATENT DOCUMENTS

| | | | |
|---|---|---|---|
| 6,501,521 B2 * | 12/2002 | Matsushita et al. | 349/106 |
| 2003/0053012 A1 * | 3/2003 | Ikeno et al. | 349/106 |
| 2003/0071942 A1 | 4/2003 | Kojima et al. | |
| 2003/0122998 A1 | 7/2003 | Iijima et al. | |
| 2003/0179327 A1 | 9/2003 | Nonaka et al. | |
| 2004/0095528 A1 | 5/2004 | Nakamura et al. | |
| 2005/0110923 A1 | 5/2005 | Yamashita et al. | |
| 2006/0082704 A1 | 4/2006 | Chu et al. | |

FOREIGN PATENT DOCUMENTS

| | | |
|---|---|---|
| JP | 11-24052 | 1/1999 |
| JP | 2002-040453 | 2/2002 |
| JP | 2004-093715 | 3/2004 |
| JP | 2004-325528 | 11/2004 |
| JP | 10-0468440 | 1/2005 |
| JP | 10-0479303 | 3/2005 |
| JP | 10-0481594 | 4/2005 |
| JP | 10-0520615 | 10/2005 |
| JP | 2005-338485 | 12/2005 |
| JP | 2005-346042 | 12/2005 |
| JP | 2006-071987 | 3/2006 |

OTHER PUBLICATIONS

European Search Report corresponding to EP 07017271.3, Jan. 25, 2008.

(Continued)

*Primary Examiner*—Mark A Robinson
*Assistant Examiner*—Michael P Mooney
(74) *Attorney, Agent, or Firm*—Innovation Counsel LLP

(57) ABSTRACT

This invention provides a liquid crystal display device capable of allowing the color saturation of light reflected from a transflective type or a reflective type liquid crystal display device to be constant. In addition, According to the invention, the color filter is adjusted according to the distribution of the colors included in the light source such that the color saturation of images displayed in the reflective mode is constant. As a result, the images are clearly exhibited in the liquid crystal display device, and resolution of the color increases.

13 Claims, 20 Drawing Sheets

OTHER PUBLICATIONS

"41.3: Invited Paper: *LED Backlighting Concepts with High Flux LEDs*", Wiep Folkerts, Lumileds Lighting, De Rijn 2, 5680 AK Best, the Netherlands, *SID 04 Digest*, pp. 1226-1229.

"*25.1: Invited Paper: Development of Wide-Color Gamut Mobile Displays with Four-primary-color LCDs*", E. Chino, et al., Sanyo Epson Imaging Devices Co., Azumino, Nagano, Japan, H. Moriya, et al., SID 06 Digest, pp. 1221-1224.

* cited by examiner

LIQUID CRYSTAL DISPLAY DEVICE

CROSS-REFERENCE TO RELATED APPLICATION

This application claims priority to and the benefit of Korean Patent Application No. 10-2006-0090563 filed in the Korean Intellectual Property Office on Sep. 19, 2006, the entire contents of which are incorporated herein by reference.

BACKGROUND OF THE INVENTION

1. Field of the Invention

This invention relates to a liquid crystal display device.

2. Description of the Related Art

A liquid crystal display device includes two display panels in which an electric field generating electrode such as a pixel electrode and a common electrode are formed with a liquid crystal layer interposed between the two display panels. Voltages applied to the electric field generating electrode apply an electric field to the liquid crystal layer that determines the alignment of the liquid crystal molecules in the liquid crystal layer which controls the polarization of incident light to display an image.

Generally, the image is viewed only from one side of the liquid crystal display device. However, a liquid crystal display device for viewing images from both sides by interposing two liquid crystal display panels has been used in various fields.

The liquid crystal display device may be classified as transmissive type, transflective type, or reflective type. Since the transflective and reflective type liquid crystal display devices utilize reflected light, the path of light to be transmitted and their color saturation is different. For this reason, the color saturation of the transflective type and reflective type liquid crystal display device is different from that of the transmissive type liquid crystal display device, causing a reduction in perceived image quality.

SUMMARY OF THE INVENTION

In accordance with an aspect of an exemplary embodiment of the invention, a liquid crystal display device includes a front light unit including a light source and a liquid crystal display panel that displays images by using light provided from the light source and is formed with color filters having apertures with little or no color saturation. According to this embodiment of the invention, the size of the aperture is changed according to the color distribution of the light provided from the light source. When the color distribution is large, the size of the aperture in the color filter of the corresponding color is large, and the size of the aperture is determined in proportion to the color distribution.

When the light source is a white LED module using a blue color LED and YAG, the size of the aperture for each color of filter is made smaller in the order of the blue color filter, the green color filter, and the red color filter.

When the light source is a red-green phosphor LED module forming red and green phosphors in addition to a white LED using a blue LED and YAG, the apertures may be formed such that the size difference thereof is within the range of 20%.

When the light source is a three-color LED module using each LED that emits blue light, green light, and red light, the apertures may be formed such that the size difference thereof is within the range of 20%.

Another embodiment of the present invention provides a liquid crystal display device including a front light unit including a light source; and a liquid crystal display panel that displays images by using light provided from the light source and is formed with color filters having different substances in the transmission area and the reflection area. According to this embodiment of the invention, the color saturation ratio of the reflection area is changed by the color distribution of light provided from the light source. When the color distribution is large, the color saturation ratio increased by the color filter of the corresponding color is low, and the color filters increase the color saturation in inverse proportion to the color distribution.

Still another embodiment of the present invention provides a liquid crystal display device including a front light unit including a light source; and a liquid crystal display panel that displays images by using light provided from the light source and is formed with color filters, substances used for the color filters having at least one color that is different in the transmission and reflection areas, at least one of the color filters in the reflection area having apertures. According to this embodiment of the invention, in the reflection area, the color saturation is increased by using the aperture or a color filter substance different from the color filter substance used in the transmission area. Further, the color saturation of the color filter is changed according to the color distribution of light provided from the light source. When the color distribution is large, the difference in color saturation among the color filters is low, and the saturation of color among the color filters increases in inverse proportion to the color distribution.

When the light source is a white LED module using a blue LED and YAG, the color saturation among the filters is increased in the order of the blue color filter, the green color filter, and the red color filter in the reflection area.

When the light source is a red-green phosphor LED module forming red and green phosphors in addition to a white LED using a blue LED and YAG, the color filters may be formed such that the difference of the color saturation among the color filters is within the range of 20%.

When the light source is a three-color LED module using each LED that emits blue light, green light, and red light, the color filters may be formed such that the difference of the color saturation among the filters is within the range of 20%.

Still another embodiment of the present invention provides a liquid crystal display device including a front light unit including a light source; and a liquid crystal display panel that displays images by using light provided from the light source, displays images by reflecting light provided from the light source, and is formed with color filters. According to the embodiment of the invention, the aperture of the blue color filter among the color filters is formed so as to be larger than the aperture of the red and green color filters, and the aperture of the green color filter is formed so as to be larger than the aperture of the red color filter.

Still another embodiment of the present invention provides a liquid crystal display device including a front light unit including a light source; and a liquid crystal display panel that displays images by using light provided from the light source, displays images by reflecting light provided from the light source, and is formed with color filters. According to the embodiment of the invention, the color filters increase the color saturation of light provided from the light source, the color saturation of the blue color filter is lower than that of the red and green color filters, and the color saturation of the green color filter is lower than that of the red color filter.

The light source may be a white LED module using a blue LED and YAG.

Still another embodiment of the present invention provides a liquid crystal display device including a front light unit including a light source; and a liquid crystal display panel that displays images by using light provided from the light source, displays images by reflecting light provided from the light source, and is formed with color filters. According to the embodiment of the invention, apertures are formed on the color filters, and the size difference among the apertures each formed in the blue color filter, the green color filter, and the red color filter is within the range of 20%.

Still another embodiment of the present invention provides a liquid crystal display device including a front light unit including a light source; and a liquid crystal display panel that displays images by using light provided from the light source, displays images by reflecting light provided from the light source, and is formed with color filters. According to the embodiment of the invention, the color filters are formed such that the difference of the color saturations increased by each color filter is within the range of 20%.

The light source may be a red-green phosphor LED module forming red and green phosphors in addition to a white LED using a blue color LED and YAG or a three-color LED module using each LED that emits blue light, green light, and red light.

Still another embodiment of the present invention provides a liquid crystal display device including a front light unit including a light source; and a liquid crystal display panel that displays images by using light provided from the light source and has color filters. According to the embodiment of the invention, the distribution difference of each color in the light source is within the range of 20%, and the color filters have a transmission area and a reflection area every each color, apertures are formed in the color filters, and the apertures are formed over the entire reflection area.

The light source may be a red-green phosphor LED module forming red and green phosphors in addition to a white LED using a blue color LED and YAG or a three-color LED module using each LED that emits blue light, green light, and red light.

BRIEF DESCRIPTION OF THE DRAWINGS

An exemplary embodiment of the present invention will hereinafter be described in detail with reference to the accompanying drawings, in which.

DETAILED DESCRIPTION OF THE EMBODIMENTS

Figure 1:
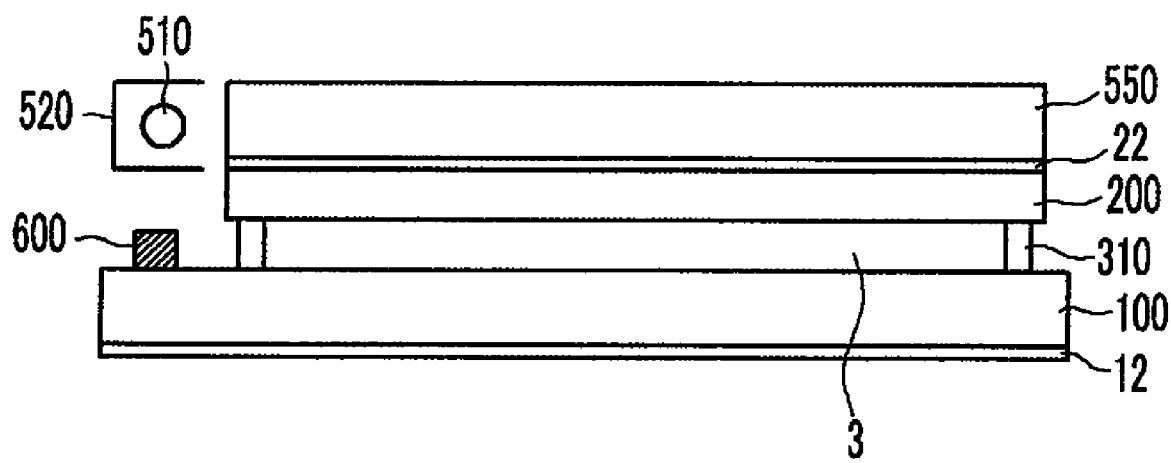
FIG. 1 is a cross-sectional view showing a liquid crystal display device according to an embodiment of the invention.

An exemplary embodiment of the present invention provides a liquid crystal display device capable of allowing the color saturation of light reflected from a transflective type or a reflective type liquid crystal display device to be constant.

In order to achieve the exemplary embodiment of the invention, a color filter is formed by different conditions in accordance with color tones of the color filter.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As shown in FIG. 1, the liquid crystal display device according to the embodiment of the invention has a liquid crystal display panel including a thin film transistor array panel 100, a color filter array panel 200, a liquid crystal layer 3, and a sealant 310. In addition, the liquid crystal display device includes a light guiding plate 550 and a light source 510 formed on the liquid crystal display panel. That is, the liquid crystal display device has a front light including the light source 510 and the light guiding plate 550.

More specifically, a lower polarizer 12 is attached to a lower surface of the thin film transistor array panel 100. Meanwhile, an upper polarizer 22 is attached to an upper surface of the color filter array panel 200. Even though not shown in FIG. 1, a lower phase retardation film 15 is located between the thin film transistor array panel 100 and the lower polarizer 12, and an upper phase retardation film 25 is located between the color filter array panel 200 and the upper polarizer 22.

The light guiding plate 550 is located at an outer side of the upper polarizer 22, and a light source 510 and a reflecting plate 520 are formed at one side of the light guiding plate 550.

The light source 510 serves to provide light into the liquid crystal display panel, and light emitted from the light source 510 enters into the light guiding plate 550. The light source 510 is surrounded by the reflecting plate 520, and the reflecting plate 520 to reflect light into light guiding plate 550.

Light guiding plate 550 leads light into the liquid crystal display panel. It is preferable to guide light into the liquid crystal display panel in a vertical direction.

As described above, the light source 510, the reflecting plate 520, and the light guiding plate 550 are located at the upper surface of the liquid crystal display panel, thereby providing light into the liquid crystal display panel in a frontal lighting manner.

Figure 4:
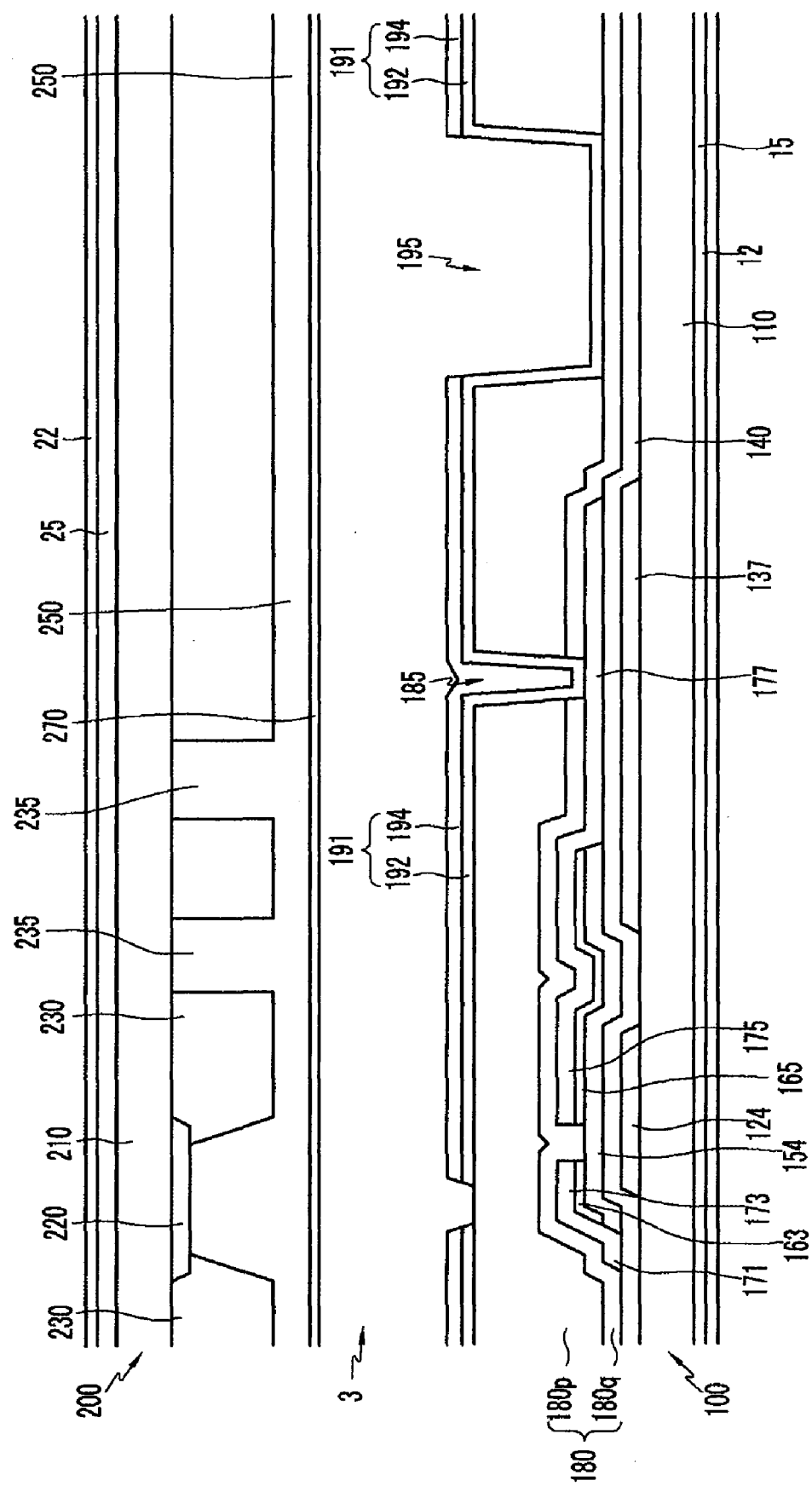

Referring to FIG. 4, the light provided into the liquid crystal display panel passes through color filter 230 and is reflected by reflective electrode 194 back through liquid crystal layer 3 and is emitted from the upper side thereof. Therefore, it is possible to view images at the upper side.

The light not reflected by electrode 194 passes through a transparent electrode 192 and liquid crystal layer 3 and is emitted from the lower side thereof. Therefore, it is possible to view images at the lower side. For this reason, it is possible to view images at both sides in the liquid crystal display device according to the embodiment of the invention.

Various embodiments may be used as a light source 510 of FIG. 1. The light source 510 according to the embodiment of the invention may be used by selecting from (1) white LED module, (2) a red-green phosphor LED module' including red and green phosphors, and (3) three kinds of LED modules (hereinafter, referred to as a 'three-color LED module') including red, green, and blue phosphors.

The white LED module is an LED module radiating white light from a blue chip LED and a YAG that is yellow phosphor. The red-green phosphor LED module is an LED module that improves the red component and green component by adding red and green phosphors on the surface of the white LED module. On the other hand, the three-color LED module uses by arranging three kinds of LEDs each radiating light of blue, red, and green.

Hereinafter, the transflective type liquid crystal display panel of the liquid crystal display device according to an embodiment of the invention will be described with reference to FIG. 2 to FIG. 4.

Figure 2:
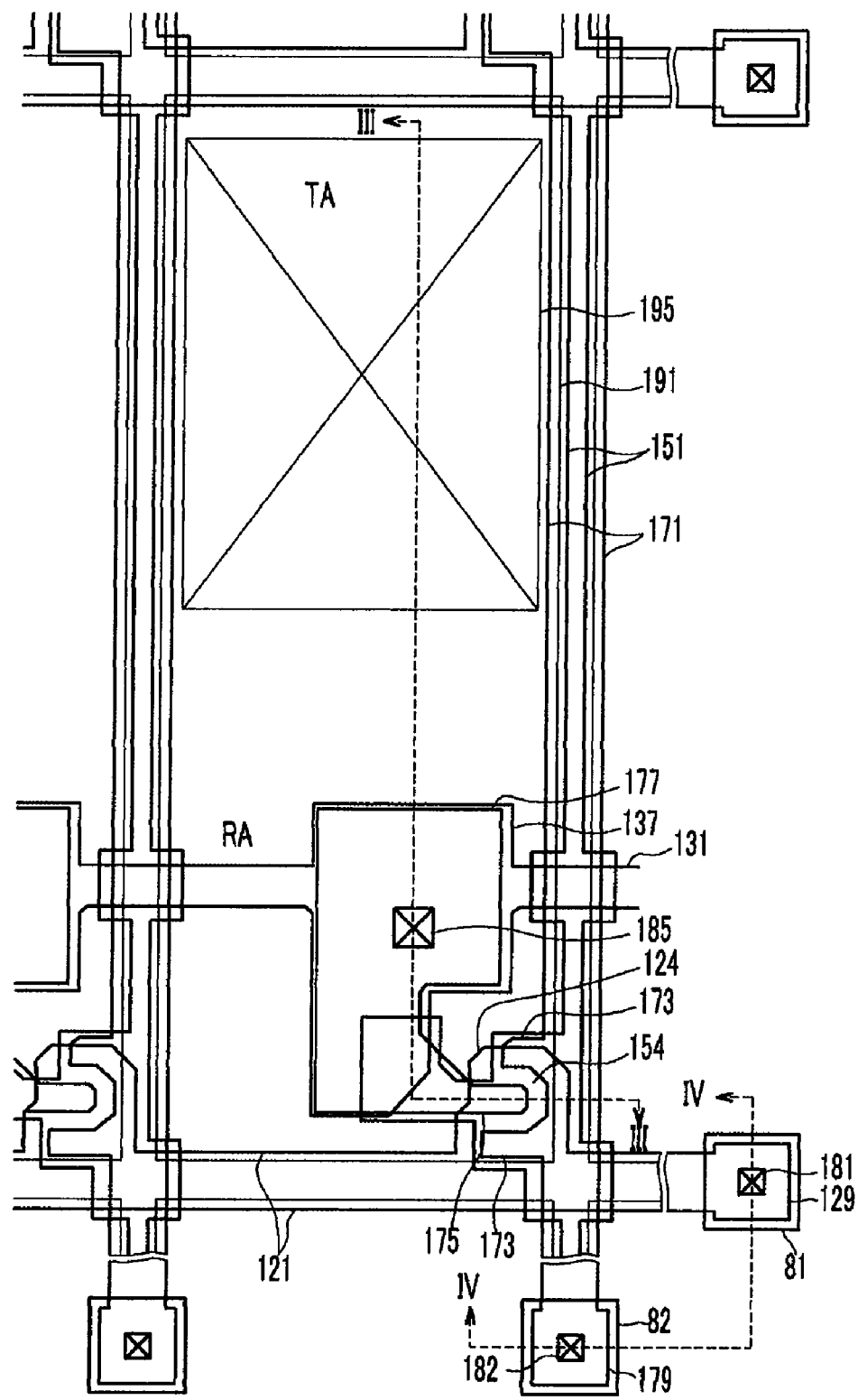
FIG. 2 is a layout view showing a pixel of a transflective liquid crystal display device according to an embodiment of the invention.
Figure 3:
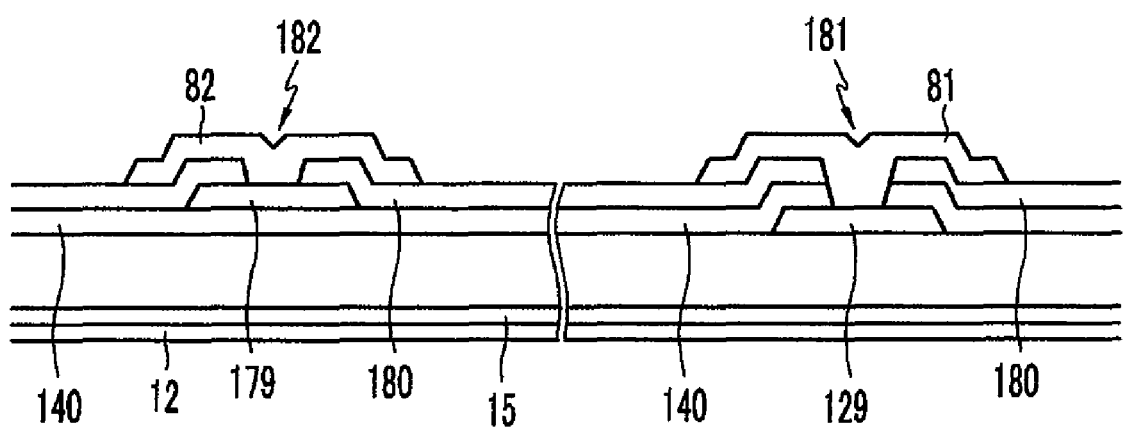
FIG. 3 and FIG. 4 are cross-sectional views taken along lines 111-111 and IV-IV of FIG. 2, respectively.

FIG. 2 is a layout showing a pixel of a transflective liquid crystal display device according to an embodiment of the invention, and FIG. 3 and FIG. 4 are cross-sectional views taken along lines III-III and IV-IV of FIG. 2, respectively.

The liquid crystal display panel according to the embodiment of the invention includes a thin film transistor array panel 100, a color filter array panel 200, and a liquid crystal layer 3 interposed between the panels 100 and 200. The liquid crystal layer 3 contains liquid crystal molecules aligned vertical or horizontal to surfaces of the panels 100 and 200.

The thin film transistor array panel 100 is now described in detail.

A plurality of gate lines 121 and a plurality of storage electrode lines 131 are formed on an insulating substrate 110 made of, for example, a transparent glass or plastic.

The gate lines 121 transmit gate signals and substantially extend in the transverse direction. Each gate line 121 includes a plurality of gate electrodes 124 protruding upwardly and an expanded end 129 provided so as to be connected to another layer or an external driving circuit.

The storage electrode lines 131 are supplied with a predetermined voltage 131 and substantially extend parallel to the gate lines 121. Each storage electrode line 131 is located between two gate lines 121 adjacent to each other so as to be closer to a lower gate line 121.

A gate insulating layer 140 made of a silicon nitride (SiNx) or silicon oxide (SiOx) is formed on the gate lines 121 and the storage electrode lines 131.

A plurality of linear semiconductor layers 151 made of hydrogenated amorphous silicon (hereinafter, the amorphous silicon referred to as "a-Si"), polysilicon or the like are formed on the gate insulating layer 140.

A plurality of linear-shaped and island-shaped ohmic contacts 161 and 165 are formed on the semiconductor layers 151. The linear ohmic contact 161 has a plurality of projections 163, and the projections 163 make pairs with the island-shaped ohmic contact 165. The pair of projection 163 and the island-shaped ohmic contact 165 is disposed on the projection 154 of the semiconductor layer 151.

A plurality of data lines 171 and a plurality of drain electrodes 175 are formed on the ohmic contacts 161 and 165 and the gate insulating layer 140.

The data lines 171 transmit the data voltages and extend in the vertical direction to intersect the gate lines 121 and the storage electrode lines 131. Each data line 171 includes a plurality of source electrodes 173 extending toward the gate electrode 124 and the expanded end 179 provided so as to be connected to another layer or an external device.

The drain electrodes 175 are separated from the data lines 171 and face the source electrodes 173 with respect to the gate electrodes 124. Each drain electrode 175 has one expanded end and the other end of a bar shape. The expanded end overlaps with the storage electrodes 137, and the bar-shaped end is partially surrounded by the source electrode 173.

One thin film transistor (TFT) includes one gate electrode 124, one source electrode 173, one drain electrode 175, and the projection 154 of the semiconductor layer 151. A channel of the thin film transistor is formed at the projection 154 between the source electrode 173 and the drain electrode 175.

The ohmic contacts 161 and 165 are disposed only between the lower semiconductor layer 151 and the upper data lines 171, thus reducing a contact resistance therebetween.

A passivation layer 180 formed on the data lines 171, the drain electrodes 175, and the exposed portions of the semiconductor layer 151. The passivation layer 180 includes a lower layer 180q made of the inorganic insulating material such as a silicon nitride and silicon oxide and an upper layer 180p made of an organic insulating material. In addition, a transmission window 195 is formed on the upper passivation layer 180p. The transmission window 195 exposes a portion of the lower passivation layer 180q. However, the passivation layer 180 may have a single layered structure made of inorganic insulating material or organic insulating materials.

A plurality of contact holes 182 and 185 for each exposing the end 179 of the data lines 171 and the drain electrodes 175 are formed on the passivation layer 180, and a plurality of contact holes 181 for exposing the end 129 of the gate lines 121 are formed on the gate insulating layer 140.

A plurality of pixel electrodes 191 and a plurality of contact assistant members 81 and 82 are formed on the passivation layer 180.

Each pixel electrode 191 is formed at the upper surface of the upper passivation layer 180p and includes a transparent electrode 192 and a reflective electrode 194 thereon. The transparent electrode 192 is made of a transparent conductive material, such as IZO or ITO, and the reflective electrode 194 is made of a reflective metal, such as aluminum, silver, chrome, or alloy thereof.

The reflective electrode 194 is located at a transmission window area of the upper passivation layer 180p and has a transmission window 195 exposing the transparent electrode 192. The reflective electrode 194 is only formed on a part of the transparent electrode 192 so as to expose another part of the transparent electrode 192. The exposed part of the transparent electrode 192 is located at the transmission window area of the upper passivation layer 180p.

The pixel electrodes 191 are physically or chemically connected to the drain electrodes 175 through the contact holes 185 such that the data voltages are applied to the pixel electrodes 191 from the drain electrodes 175. The pixel electrodes 191 supplied with the data voltages generate electric fields in cooperation with a common electrode 270 of the color filter array panel 200 to which a common voltage is applied, thereby determining the direction of liquid crystal molecules in the liquid crystal layer 3 between two electrodes 191 and 270.

The transflective type liquid crystal display panel including the thin film transistor array panel 100, the color filter array panel 200, and the liquid crystal layer 3 may be divided into a transmission area TA and a reflection area RA defined by the transparent electrode 192 and the reflective electrode 194. More specifically, the transmission area TA is a section of portions disposed on and under the transmission window 195, and the reflection area RA is a section of portions disposed on and under the reflective electrode 194.

In the transmission areas TA, light entered from the upper surface of the liquid crystal display panel, that is, from color filter array panel 200 is emitted toward the lower surface, that is, the thin transistor array panel 100 by passing through the liquid crystal layer 3, thus displaying images. In the reflection areas RA, light supplied through the upper surface of the LCD panel passes through the LC layer 3, and is then reflected by the reflective electrodes 194. After light is reflected, light passes through the LC layer 3 again and then emits toward the upper surface of the LCD panel, thus displaying images. At this time, light is reflected and dispersed by refraction of the reflective electrode 194.

The upper passivation layer 180p does not exist in the transmission areas TA. Accordingly, the thickness of the LC layer 3 or the cell gap relative to the transmission areas TA is twice as large as the thickness of the LC layer 3 or the cell gap relative to the reflection areas RA.

The contact assistant members 81 and 82 are connected to the end 129 of the gate lines 121 and the end 179 of the data lines 171 through the contact holes 181 and 182, respectively. The contact assistant members 81 and 82 complement adhesive property in which the end 129 of the gate lines 121 and the end 179 of the data lines 171 are adhered to the external devices, and prevent the above elements.

Hereinafter, the color filter array panel 200 will be described.

A light blocking member 220 is formed on the insulating substrate 210 made of, for example, the transparent glass or plastic. Light blocking members 220 called "black matrix" define aperture regions facing the pixel electrodes 191 and 220 prevent light from leaking out through barriers between the pixel electrodes 191.

A plurality of color filters 230 are also formed on the substrate 210. Most color filters 230 are disposed within the aperture regions surrounded by the light blocking members 220. The color filters 230 extend along the pixel electrodes 191 in the vertical direction to form a stripe. Each color filter 230 may exhibit one of primary colors such as red, green, and blue colors. The color filters 230 are formed at the entire transmission area TA. However, apertures 235 are formed at the reflection area RA. The reason for the apertures 235 is that, in the transmission area TA, light passed through transparent electrode 192 passes through color filter 230 once whereas, in reflection area RA, light passes through color filter 230 twice since it is reflected from the color filter array panel. The size and number of the apertures 235 are changed according to the kinds of light sources and colors of the color filters, as will be described below.

An overcoat 250 is formed on the color filters 230 and the light blocking member 220, and a common electrode 270 is formed on the overcoat 250. The common electrode 270 is preferably made of transparent conductive materials such as ITO and IZO.

An alignment layer (not shown) is applied to an inner surface of the array panels 100 and 200 so as to align the liquid crystal layer, and polarizers 12 and 22 and phase retardation films 15 and 25 are provided at an outer surface of the array panels 100 and 200, respectively. A $\lambda/4$ plate or $\lambda/4$ plate is preferably used for the phase retardation films 15 and 25, and the $\lambda/4$ plate and $\lambda/2$ plate may be used together.

Figure 5:
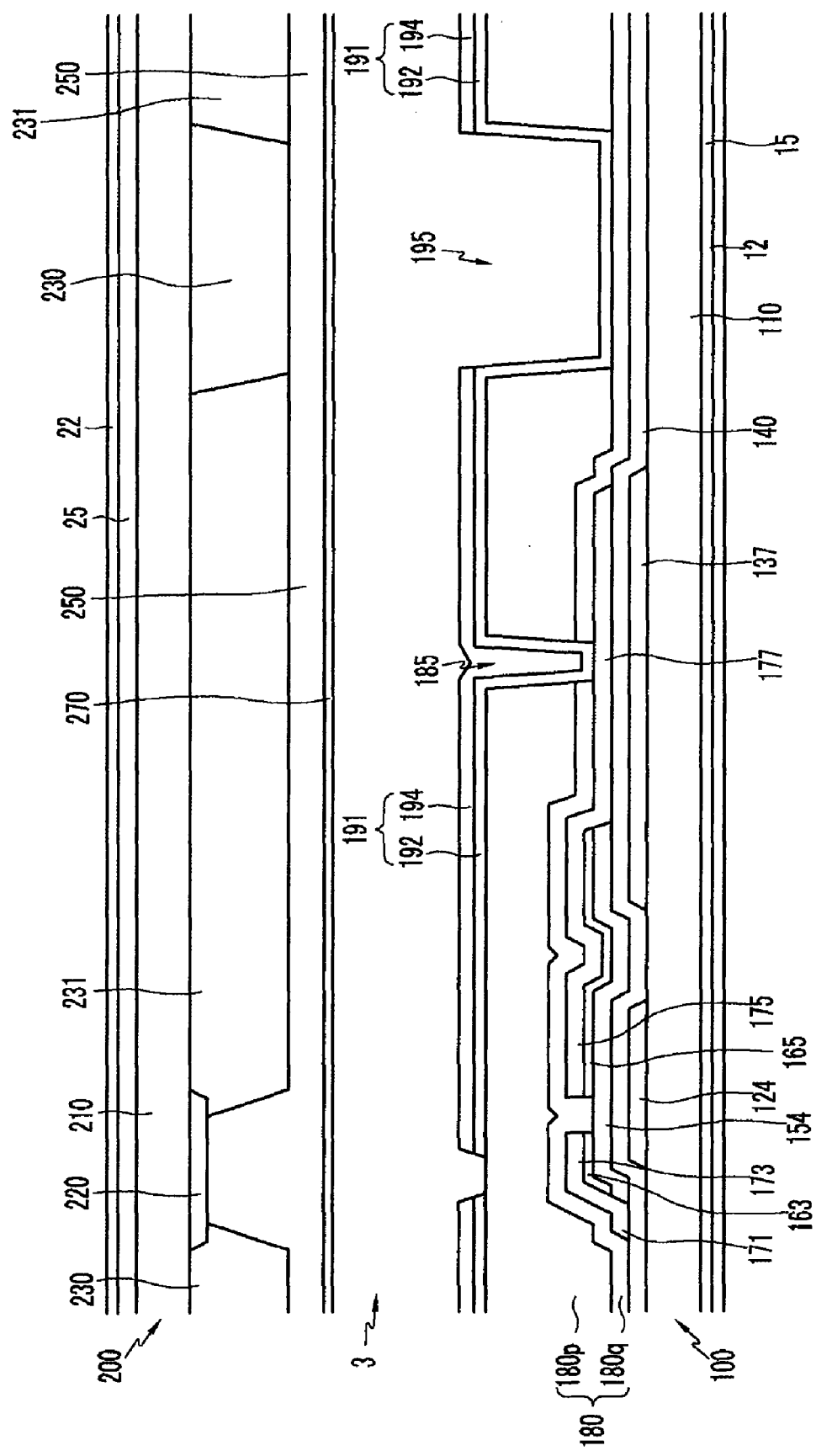
FIG. 5 is a cross-sectional view taken along line III-III of FIG. 2 and is a view according to an embodiment of the invention different to that of FIG. 3.

FIG. 5 is a cross-sectional view taken along line III-III of FIG. 2 and is a view different to the embodiment of FIG. 3.

FIG. 5 shows a different arrangement of color filters from that of FIG. 4. In the embodiment of FIG. 5, the color filters used in the reflection area RA and the transmission area TA in one pixel are formed of different substances. The color filter 231 of the reflection area RA has less color saturation than the color filter 230 of the transmission area TA. Therefore, if light used in the reflection area RA is twice passed through the color filter 231, the color saturation of the passed light is equal to that of the transmission area TA. The color filter 231 of the reflection area RA and the color filter 230 of the transmission area TA may have the same or different thicknesses. For example, color filter 231 in the reflection area RA may be thinner than color filter 230 in the transmission area TA.

Except for the above-described description, the embodiment of FIG. 5 is substantially the same as that of FIG. 3.

The relationship according to kinds of light sources and the colors of the color filters due to the kinds of light sources will be described with reference to FIG. 6 to FIG. 15.

Figure 6:
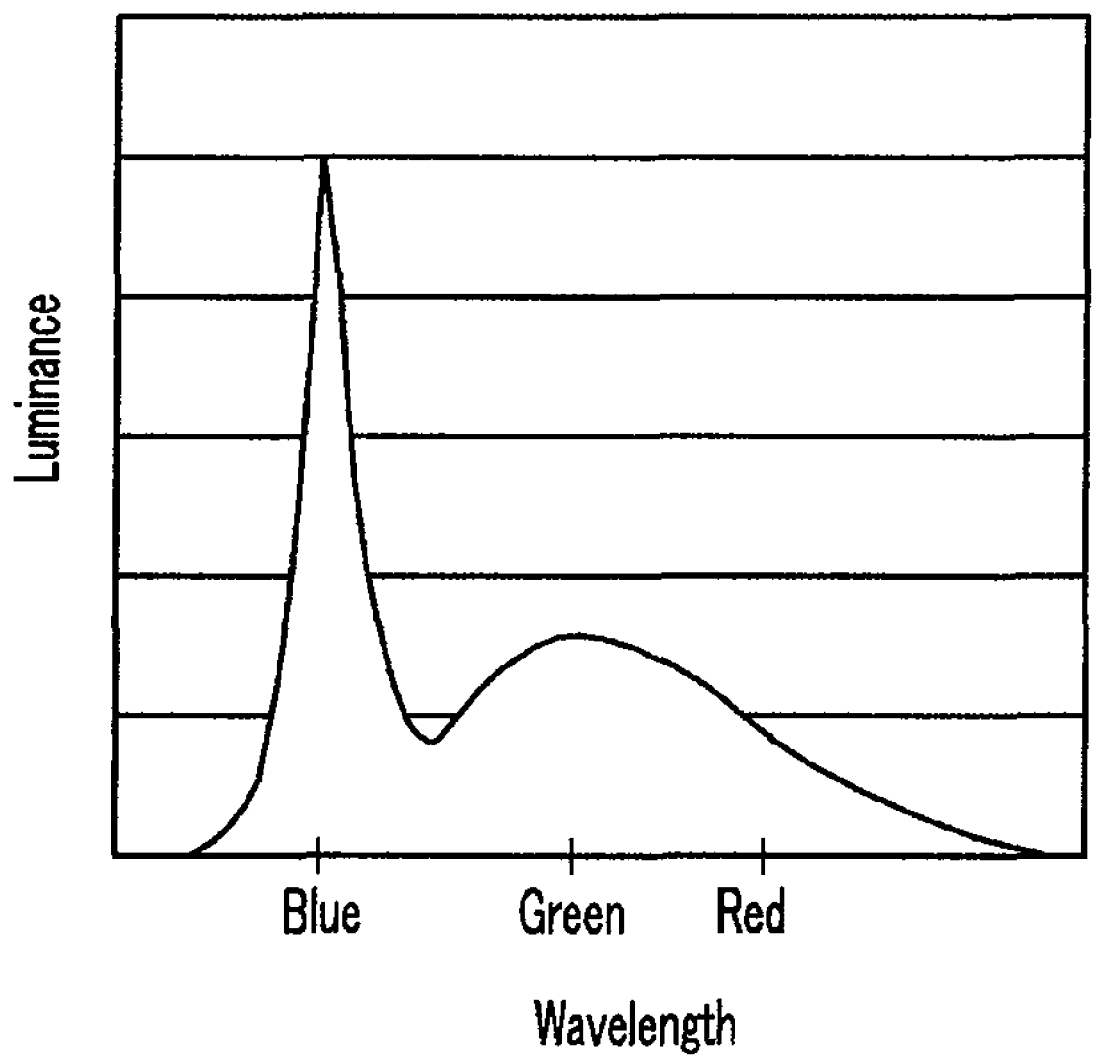
FIG. 6 is a view showing luminance according to a wavelength of light emitted from a white LED module in case of using the white LED module as a light source.
Figure 7:
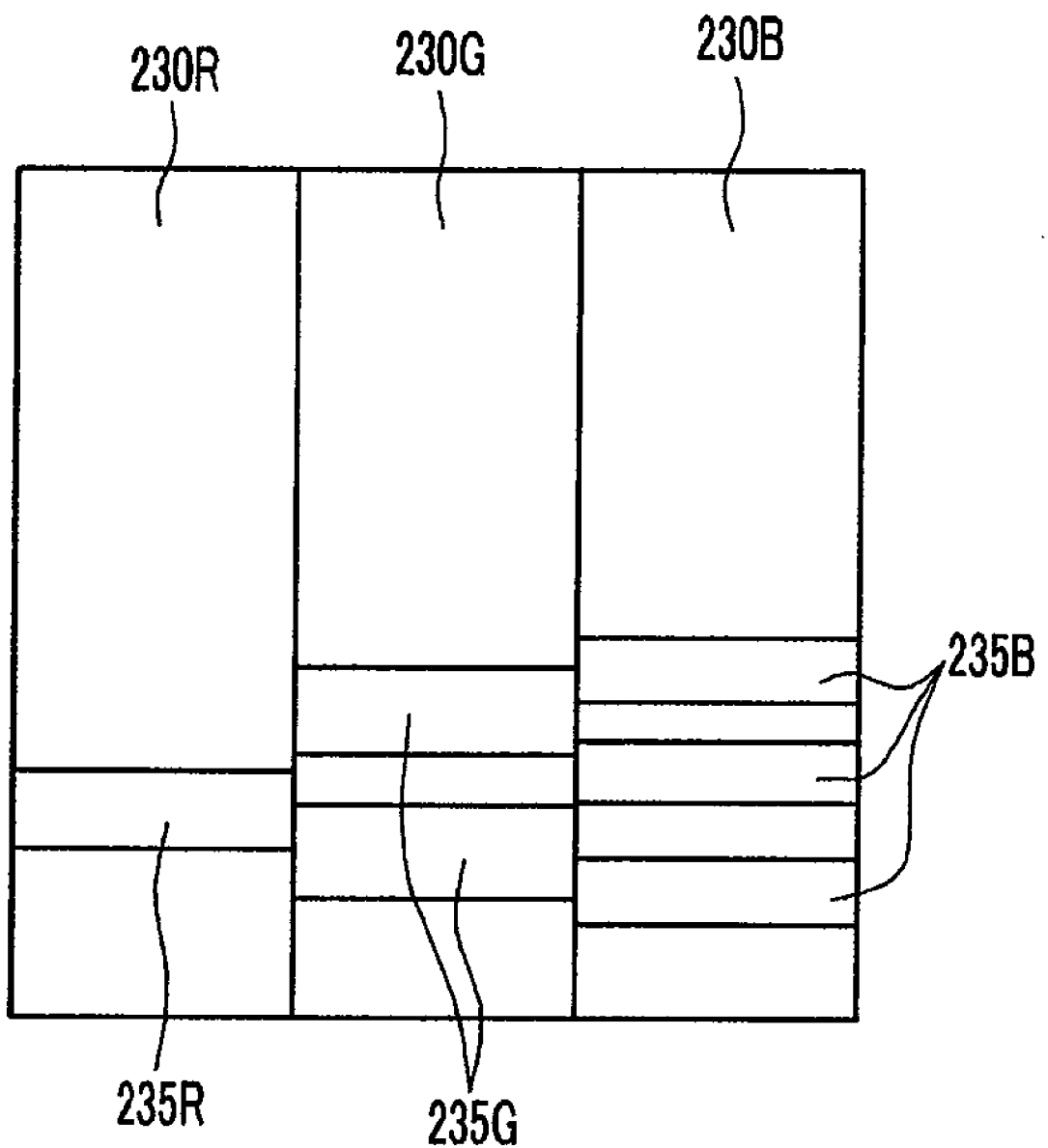
FIG. 7 to FIG. 9 are views showing color filters according to each embodiment of the invention using the light source of FIG. 6, respectively.
Figure 8:
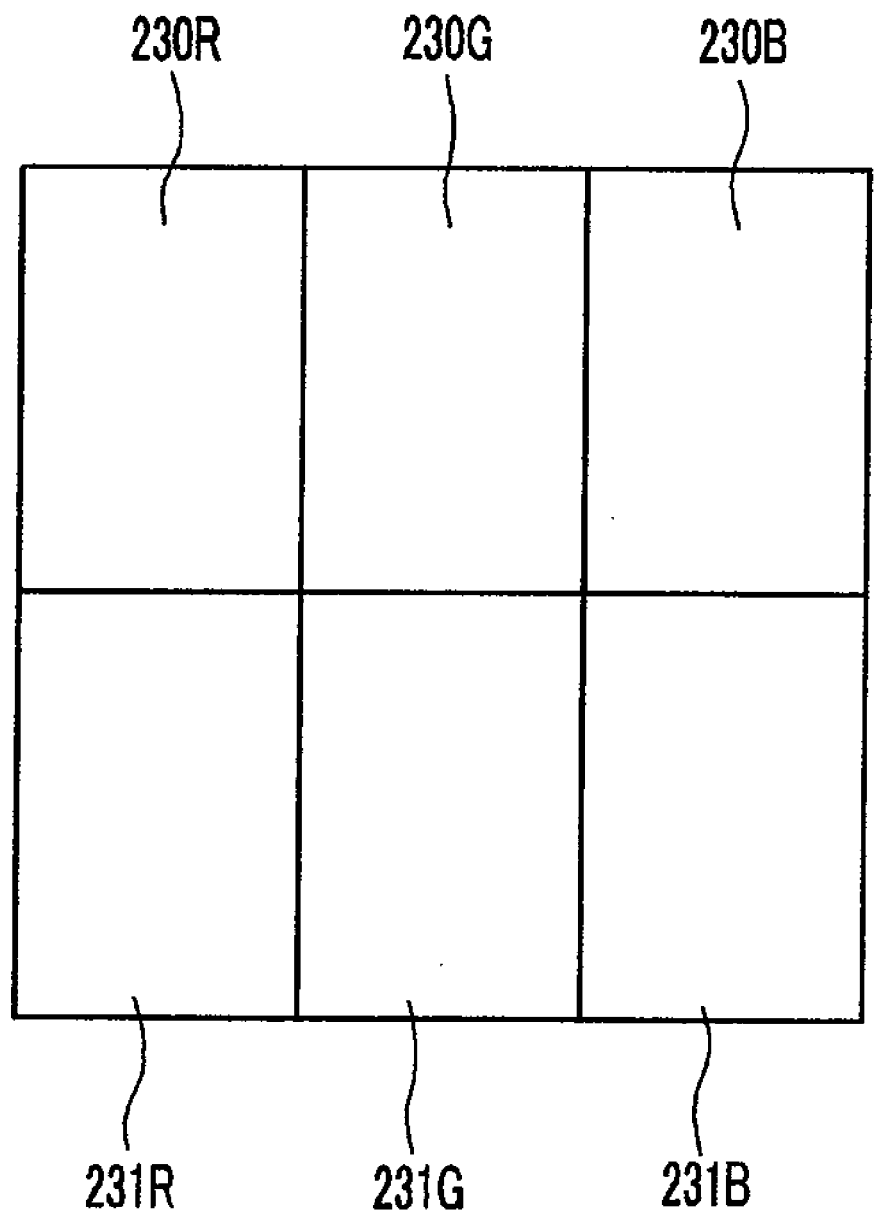
Figure 9:
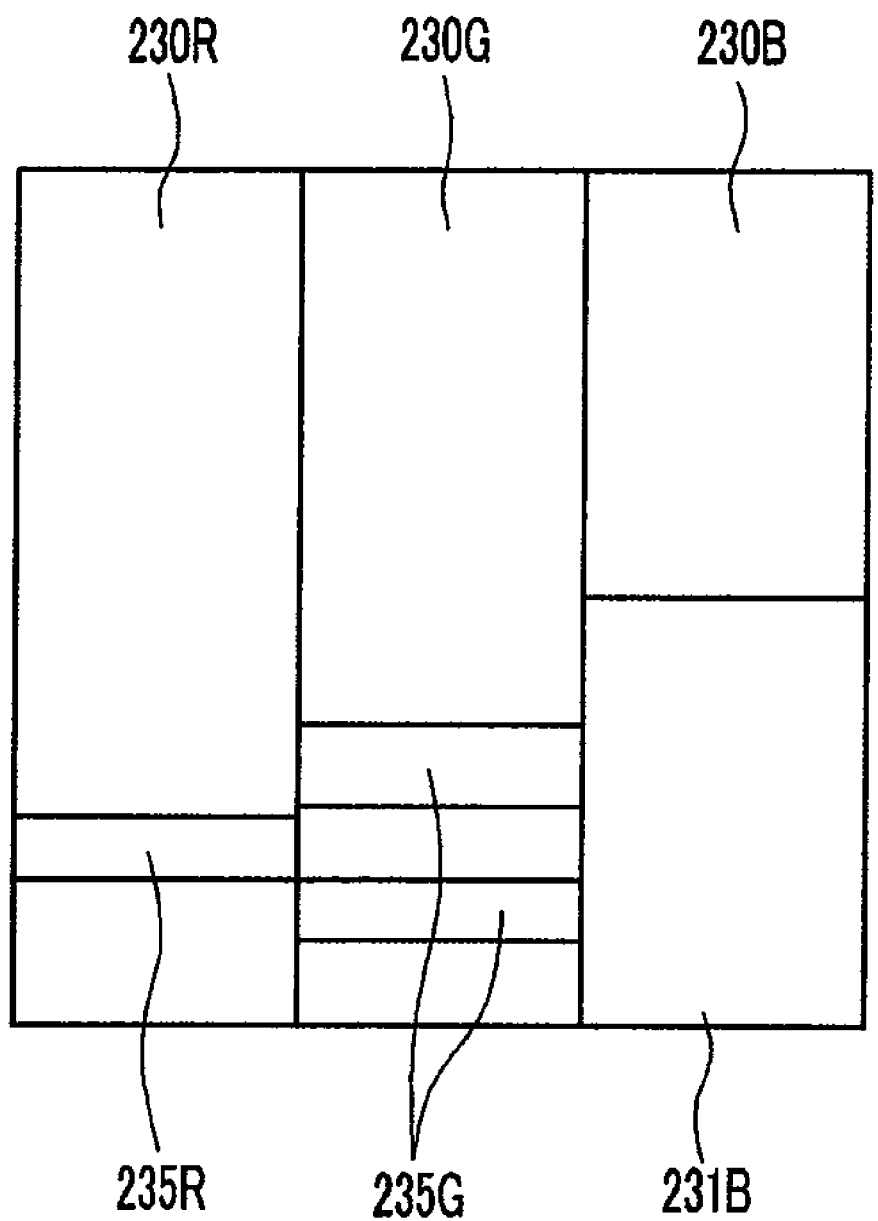

FIG. 6 is a view showing luminance according to wavelength of light emitted from a white LED module as a light source, and FIG. 7 to FIG. 9 are views showing color filters according to each embodiment of the invention using the light source of FIG. 6.

FIG. 6 to FIG. 9 are views showing the embodiments using the white LED module as a light source.

FIG. 6, shows that the white LED module, which emits white light by using yellow YAG on a blue chip LED, yields the blue light component as the brightest.

The term color distribution means the proportional area of the luminance graph occupied by each of the predominant wavelengths.

For example, the color distribution for the white LED, has the order blue>green>red.

FIG. 7 shows an embodiment where apertures are formed in the color filter.

FIG. 7 is a view showing briefly only the color filter. When the color filter is divided into halves in up and down directions, the upper portion is the transmission area TA, and the lower portion is the reflection area RA. As shown in FIG. 7, the reflection area RA includes the apertures 235 so as to adjust the color saturation. In case of using the white LED module, since the distribution of the blue color is the largest, the blue color filter has the largest apertures 235. In addition, the distribution of the green color is larger than that of the red color (see FIG. 6), the aperture 235 of the green color filter 235 is larger than the aperture 235 of the red color filter. Since the color filter provides no color saturation for the corresponding color in the apertures 235, the color saturation of the corresponding color that is actually transmitted through the color filter is reduced. Accordingly, light passing through the reflection area controls the color saturation of the light source and the color filter so as to have harmonious color saturation.

FIG. 8 shows the embodiment in which the color filter in the reflection area RA and the transmission area TA is each formed of different substances. That is, the red color filter in the reflection area RA is indicated by reference numeral 231R, and the red color filter in the transmission area TA is indicated by reference numeral 230R. Moreover, the green and blue color filters in the reflection area RA are indicated by reference numerals 231G and 231B, respectively, and the green and blue color filters in the transmission area TA are indicated by reference numeral 230G and 230B, respectively.

Since the white LED module is used in this embodiment, the color distribution of light provided from the light source is reduced in the order of blue color, green color, and red color. Therefore, the color filter is formed at the reflection area such that the color saturation increasing ratio by the color filter is reduced in the order of the red color filter 231R, green color filter 231G, and blue color filter 231B. As a result, light transmitting the reflection area controls the color saturation of the light source and the color filter so as to have a harmonious color saturation.

Meanwhile, FIG. 9 shows an embodiment in which the only blue color filter is formed of two kinds of substances and the red and green color filters are formed with the apertures.

Since the white LED module is used in this embodiment, the color distribution of light provided from the light source is reduced in the order of blue color, green color, and red color. Therefore, the color filter is formed at the reflection area such that the color saturation is increased in the order of the red color filter 231R, green color filter 231G, and blue color filter 231B. However, the blue color filter 231B increases the color saturation slightly by using a separate substance, and the green and red color filters increase the color saturation sufficiently by using the apertures 235G and 2235R. Since the red color filter in the reflection area increases the color saturation as compared to the green color filter in the reflection area, the aperture 235R of the red color filter in the reflection area is formed so as to be smaller than the aperture 235G of the green color filter in the reflection area.

According to this embodiment of the invention, the blue color filter is formed at the reflection area by using the separate substance, but other colors may also be formed of a separate substance. However, since the white LED module is used even in this case, the color filter is formed at the reflection area such that the color saturation is in the order of blue, green, and red.

Figure 10:
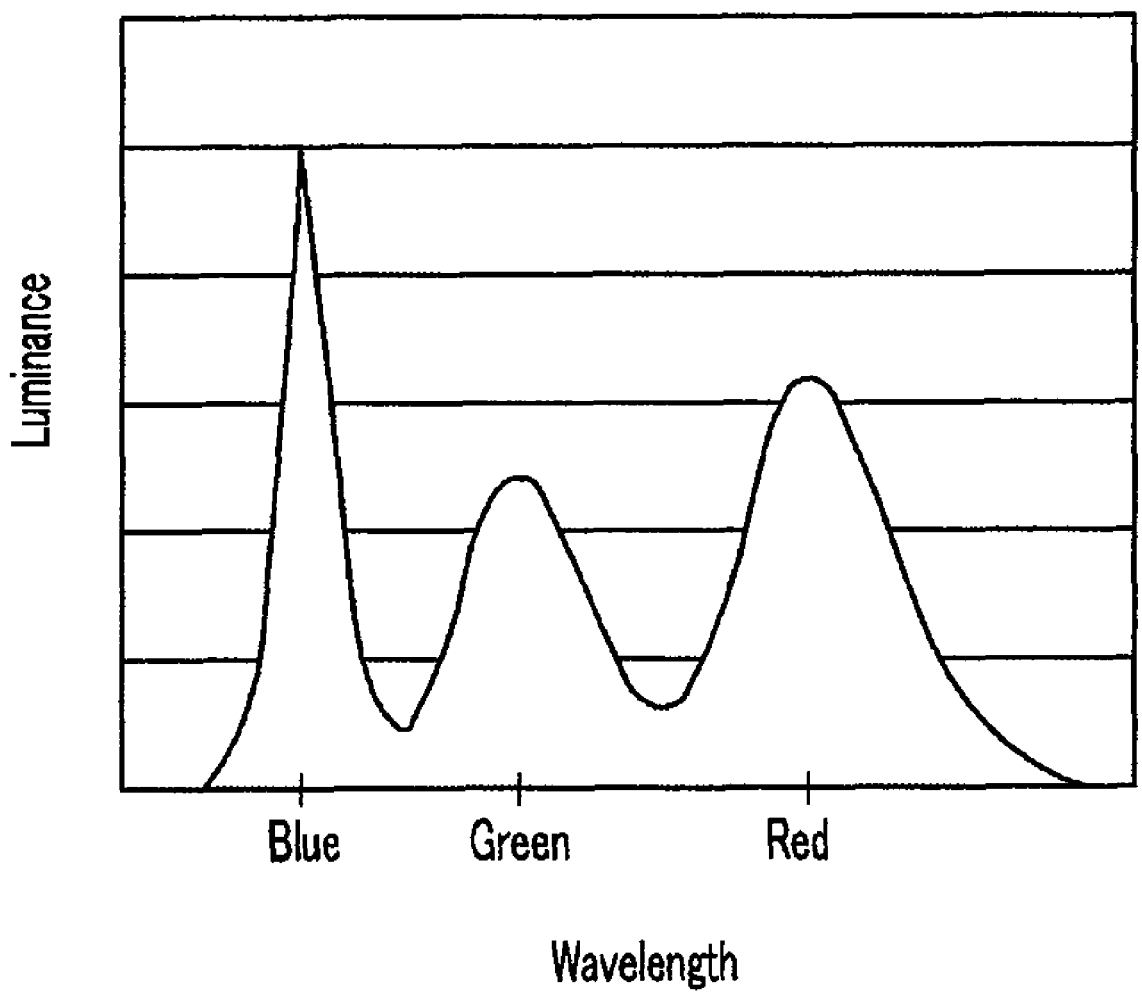
FIG. 10 is a view showing luminance according to a wavelength of light emitted from LED module in case of using LED module including a red color and green color phosphors as a light source.
Figure 11:
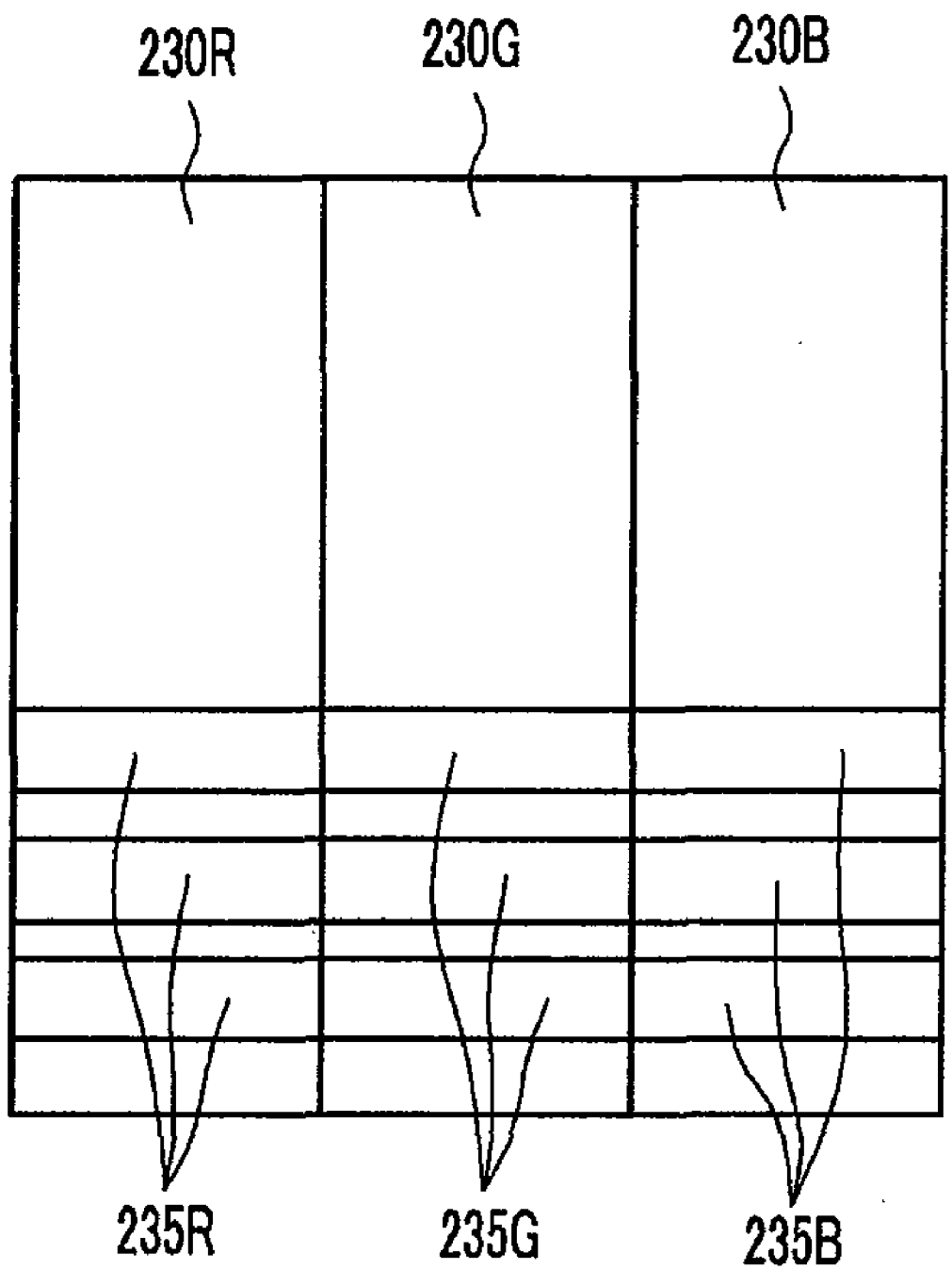
FIG. 11 to FIG. 13 are views showing color filters according to each embodiment of the invention using the light source of FIG. 10, respectively.
Figure 12:
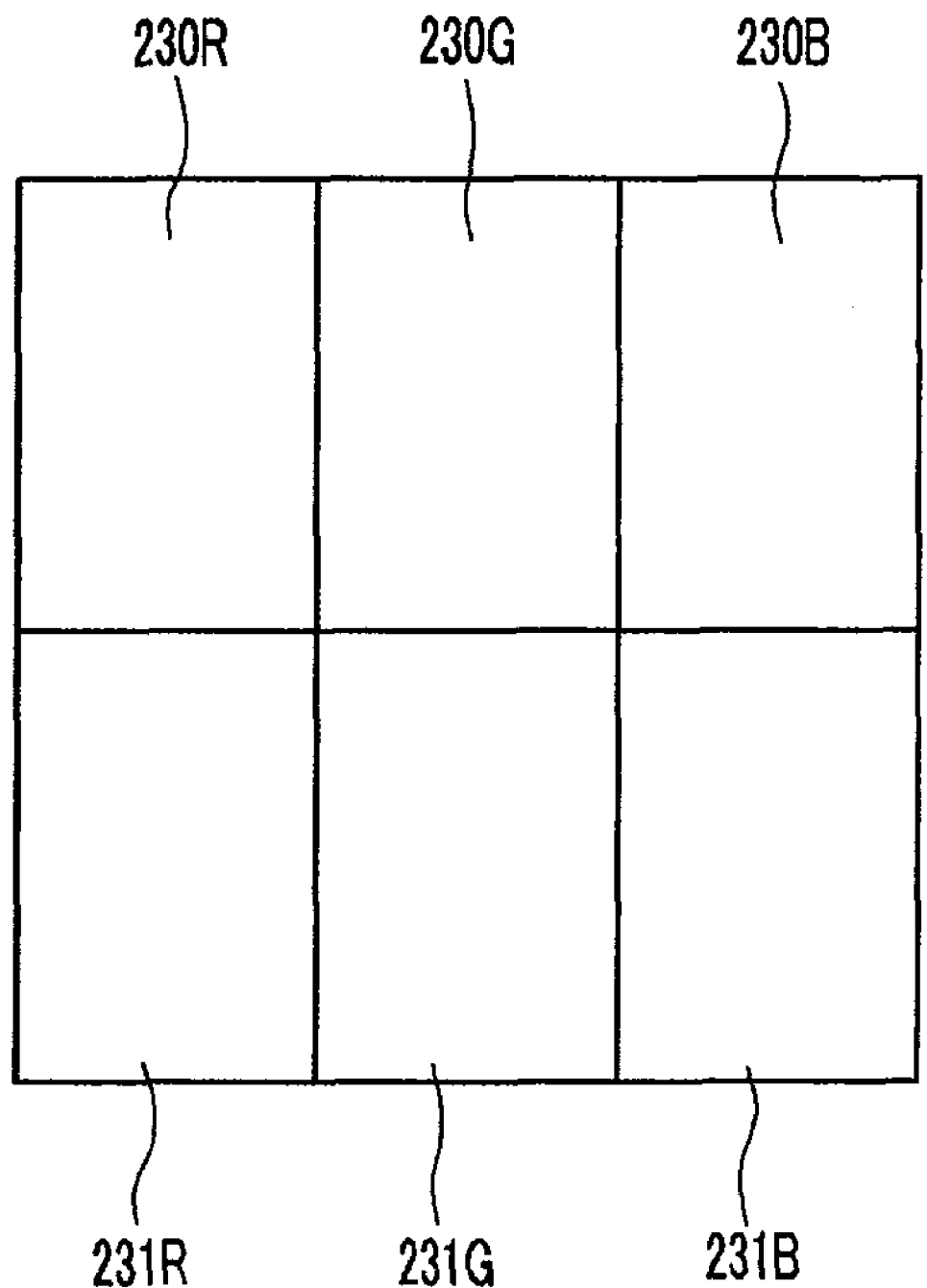
Figure 13:
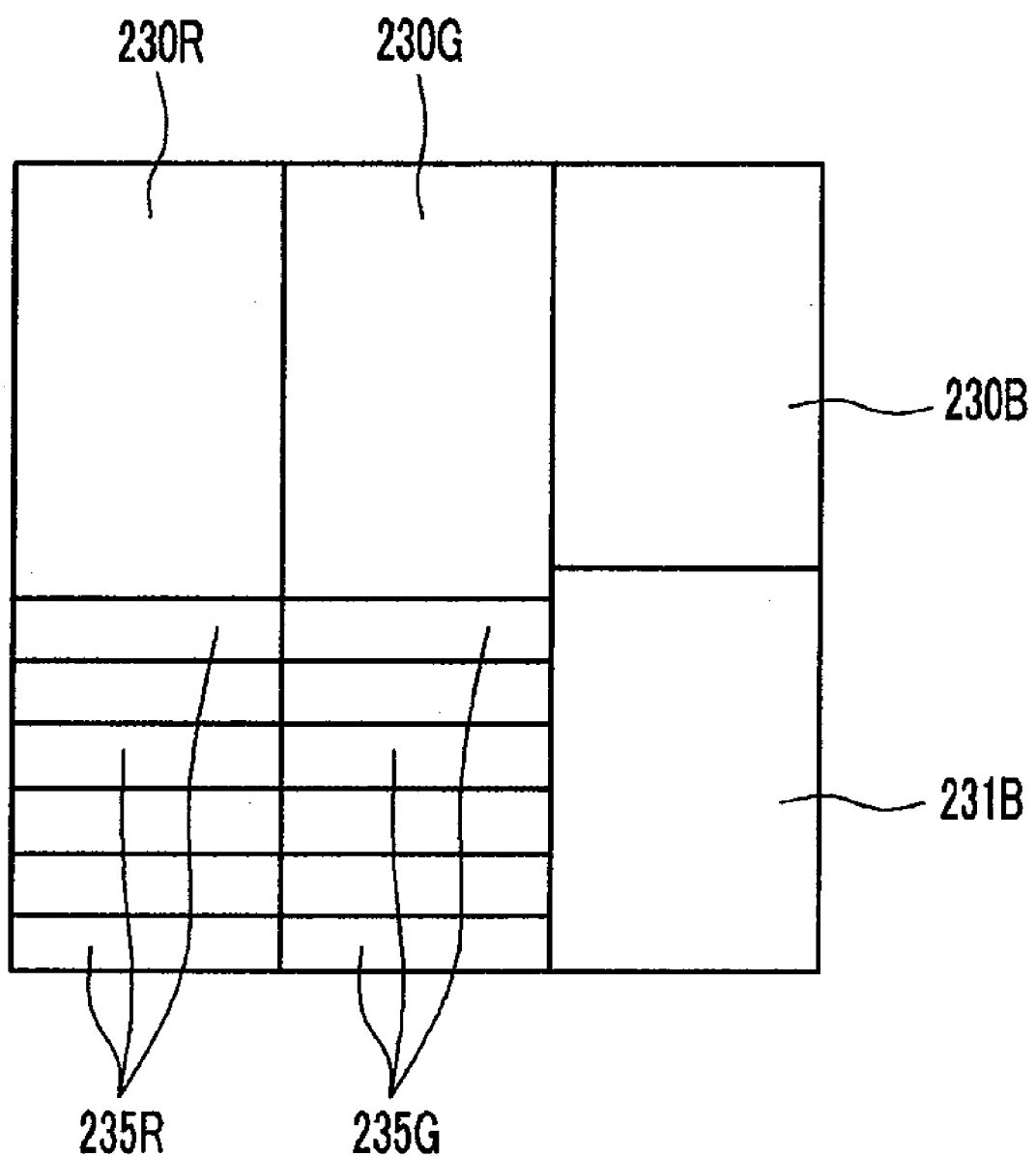

FIG. 10 is a view showing luminance according to a wavelength of light emitted from LED module where an LED module includes red and green color phosphors as the light source, and FIG. 11 to FIG. 13 are views showing color filters according to each embodiment of the invention using the light source of FIG. 10.

FIG. 10 to FIG. 13 are views showing an embodiment using a red-green phosphor LED module. As described above, the red-green phosphor LED module is an LED module that improves the red color component and the green color component by applying the phosphor of the red and green colors on the white LED module.

FIG. 10 shows the luminance graph according to the wavelength of light emitted from the red-green phosphor LED module. As shown in FIG. 10, the distribution of the blue light is plentiful. In addition, the distribution of the red light and the green light corresponds to the distribution of the blue light due to the red and green phosphors formed on the surface. Generally, in case of the red-green phosphor LED module, the difference of the color distribution is within the range of 20%.

FIG. 11 is a view showing briefly only the color filter. When the color filter is divided into halves in up and down direction, the upper portion is the transmission area TA, and the lower portion is the reflection area RA. As shown in FIG. 11, the reflection area RA includes the apertures 235 so as to adjust the color saturation. In case of using the red-green phosphor LED module, since the luminance of the blue, green, and red colors harmonize with each other, apertures having the same size are formed, thereby maintaining the balance of the color saturation. However, since the difference of the color distribution in the light source is within the range of 20%, the size differences of the apertures 235 may be also within the range of 20%.

FIG. 12 shows an embodiment in which the color filter of the reflection area RA and the transmission area TA is each formed of different substances. That is, the red color filter of the reflection area RA is indicated by reference numeral 231R, and the red color filter of the transmission area TA is indicated by reference numeral 230R. Moreover, the green and blue color filters of the reflection areas RA are indicated by reference numerals 231G and 231B, respectively, and the green and blue color filters of the transmission areas TA are indicated by reference numeral 230G and 230B, respectively.

Since the red-green LED module is used in this embodiment, no difference in the distribution of the blue, green, and red colors exists in light provided from the light source. Therefore, the color filter is formed at the reflection area such that the ratio of the color filters providing the color saturation is equal to each other. However, since the difference of the color distribution in the light source is within the range of 20%, the difference between the color saturation may be within the range of 20%.

FIG. 13 shows an embodiment in which only the blue color filter is formed of two kinds of substances and apertures are formed in the red and green color filters.

Since the red-green LED module is used in this embodiment, the difference in the distribution of the blue, green, and red colors is small in the light provided from the light source. Therefore, the color filter is formed at the reflection area such that the ratio of the color saturation is not substantially different among the filters. However, the blue color filter 231B increases the color saturation by using a separate substance, and the green and red color filters increase the color saturation by using the apertures 235G and 2235R. Since the green color filter and the red color filter in the reflection area increase the color saturation by the same ratio, the size of the aperture 235G in the green reflection area is equal to that of the aperture 235R in the red reflection area. However, since the difference of the color distribution in the light source is within the range of 20%, the difference of the ratio of the color saturation may be within the range of 20% in each color.

According to this embodiment of the invention, the blue color filter is formed at the reflection area by using a separate substance, but other colors may be used. However, since the red-green phosphor LED module is used as a light source even in this case, the color filter is formed at the reflection area such that the ratio of the color saturation is the same in each color. Since the difference of the color distribution in the light source is within the range of 20%, the difference of the ratio of the color saturation may be within the range of 20% in each color.

The red-green phosphor LED module according to the embodiment of the invention was described on the basis of uniformly increasing the color saturation according to the distribution of the blue, green, and red colors. However, the difference in the distribution of the blue, green, and red colors occurs in accordance with the red-green phosphor LED module. In case the difference occurs, the color filter in the reflection area having the maximum color distribution is formed so as to slightly increase the color saturation. At this time, in case of forming the aperture, the largest aperture is formed.

Figure 14:
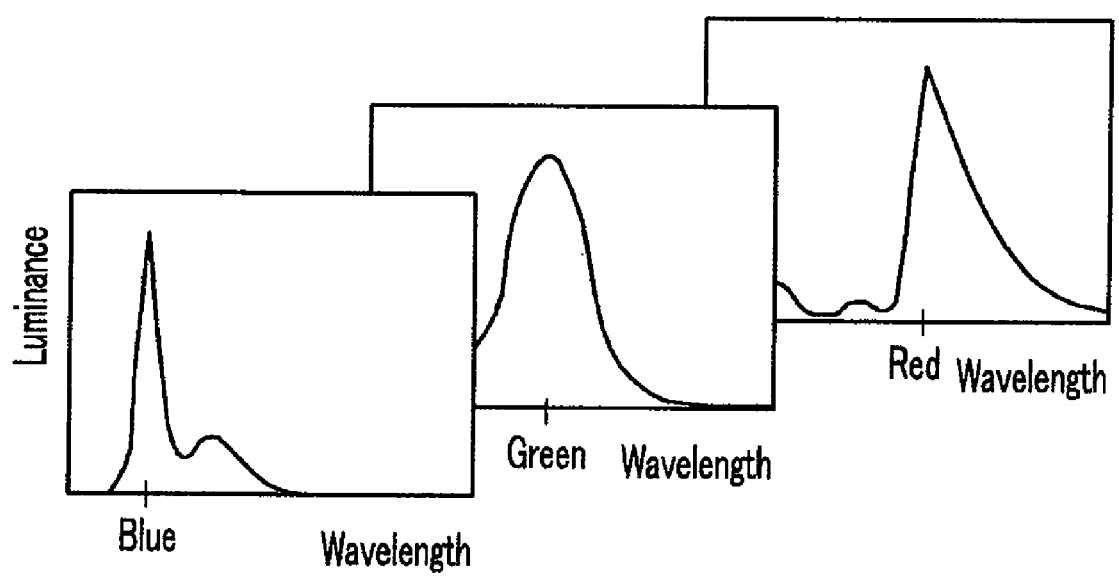
FIG. 14 is a view showing luminance according to a wavelength of light emitted from LED module in case of using LED module of a red color, a green color, and blue color as a light source.
Figure 15:
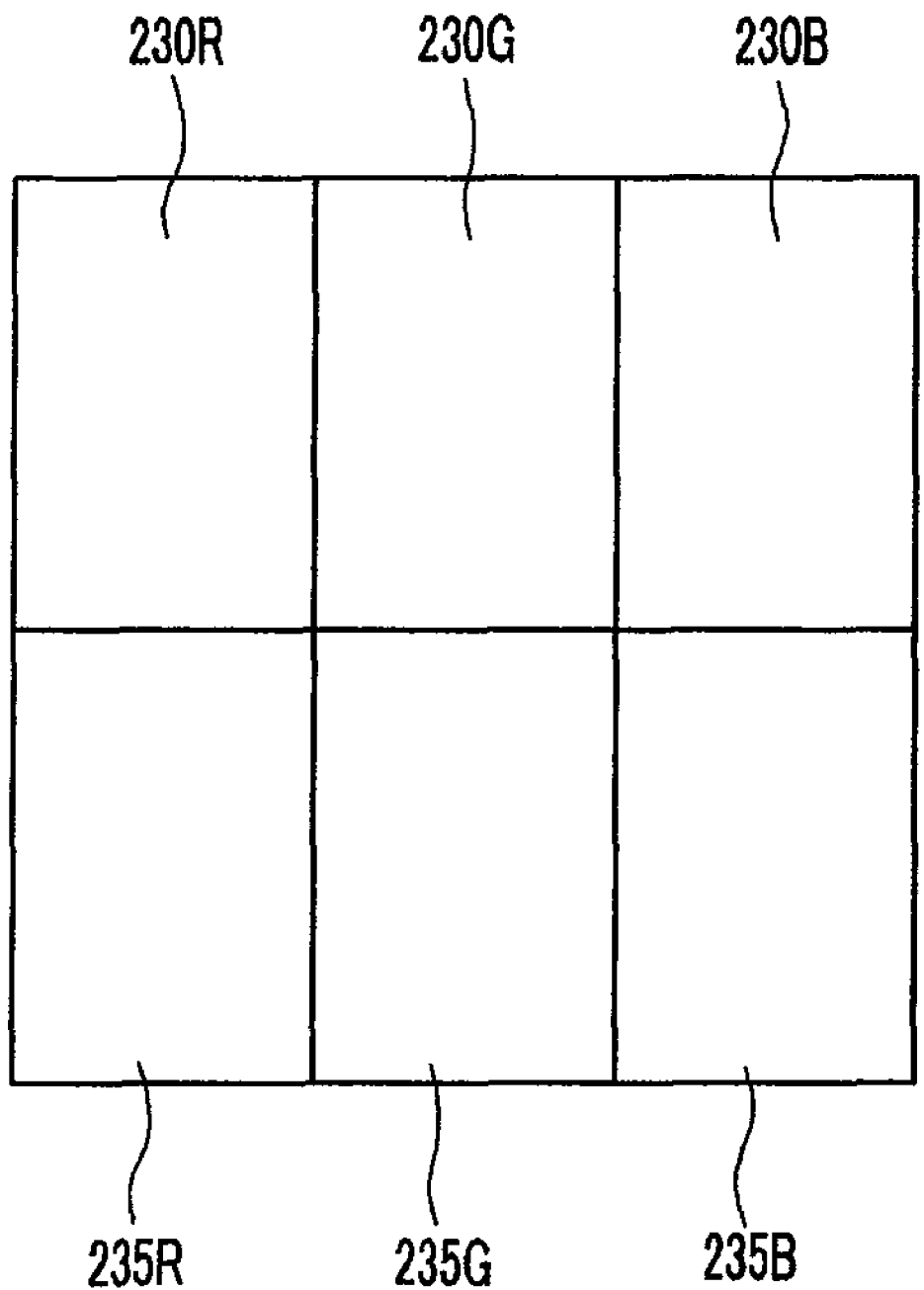
FIG. 15 is views showing color filters according to an embodiment of the invention using the light source of FIG. 14.

FIG. 14 is a view showing luminance according to a wavelength of light emitted from LED module in case of using LED module of a red color, a green color, and blue color as a light source, and FIG. 15 is views showing a color filter according to an embodiment of the invention using the light source of FIG. 14.

FIG. 14 and FIG. 15 are views showing an embodiment using a three-color LED module. As described above, the three-color LED module is used by arranging three kinds of LEDs emitting blue light, red light, and green light.

FIG. 14 shows luminance graph according to the wavelength of light emitted from the three-color LED module. As shown in FIG. 14, since the three-color LED module uses LED modules exhibiting each color, the three colors have high luminance, and each color has a harmonious distribution.

FIG. 15 is a view showing briefly only the color filter. When the color filter is divided into halves in the up and down direction, the upper portion is the transmission area TA, and the lower portion is the reflection area RA. As shown in FIG. 15, the reflection area RA forms the apertures 235 so as to adjust the color saturation. The aperture 235 is formed over the reflection area RA. Since each LED module sufficiently exhibits the red color, the blue color, and the green color, the color saturation may be sufficiently exhibited without the color filter. If necessary, the color filter may be formed at a part of the reflection area.

When using the three-color LED module, since the blue color, the green color, and the red color have a harmonious distribution, apertures having the same size are formed, thus maintaining the balance of the color saturation. However, since the difference of the color distribution in the three-color LED module is within the range of 20%, the apertures may be formed so as to have the size difference of 20%.

Alternatively, even when using the three-color LED module, a color filter having the same structure as used for the red-green phosphor LED module may be used in the reflection area. The reason for this is that the red color, green color, and blue color are balanced with each other in the light source of both the embodiment using the red-green phosphor LED module and the embodiment using the three-color LED module.

It will now be described how the embodiments of the invention are applied to the reflective type liquid crystal display device.

Figure 16:
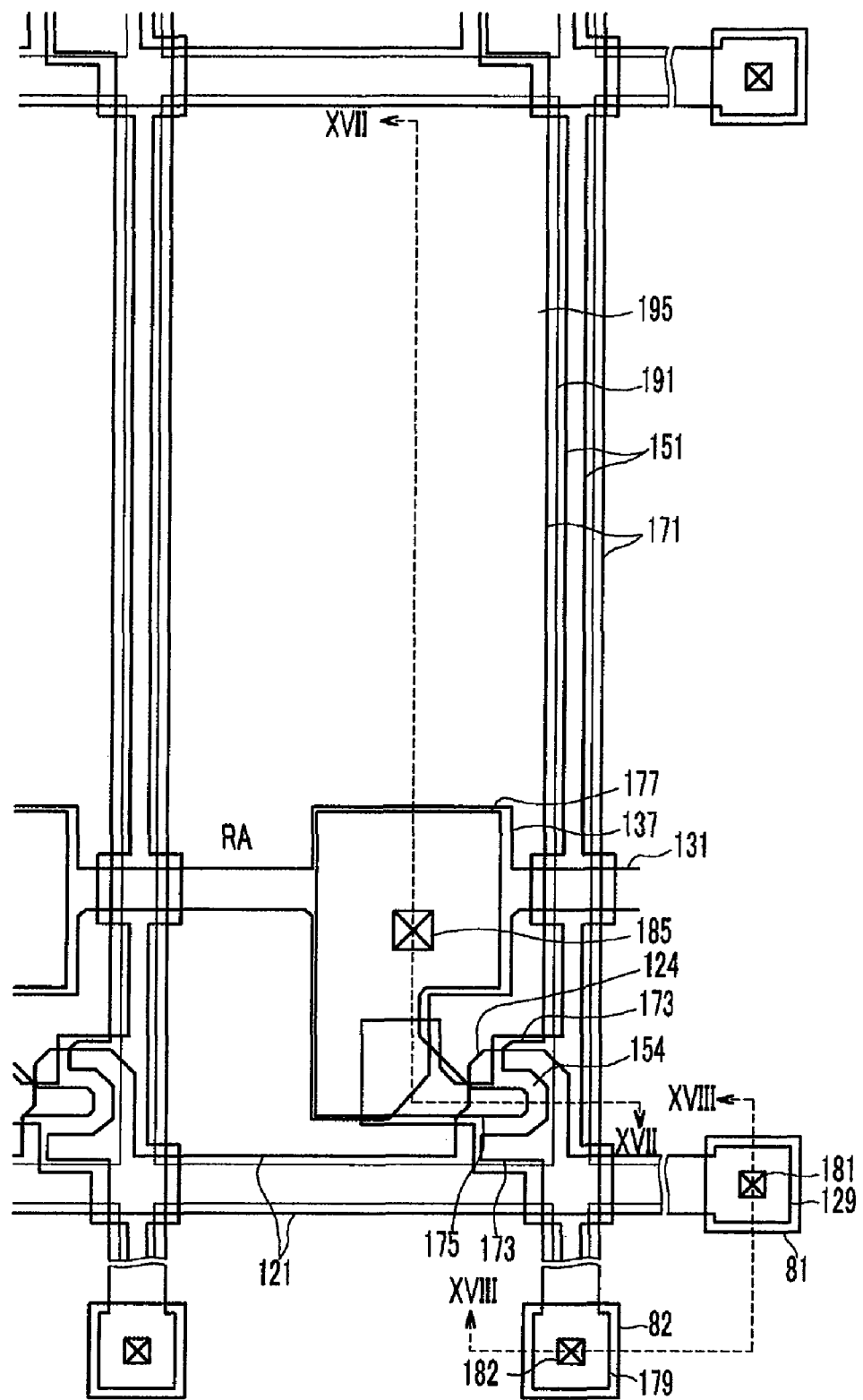
FIG. 16 is a layout view showing a pixel of a reflective type liquid crystal display device according to an embodiment of the invention.
Figure 17:
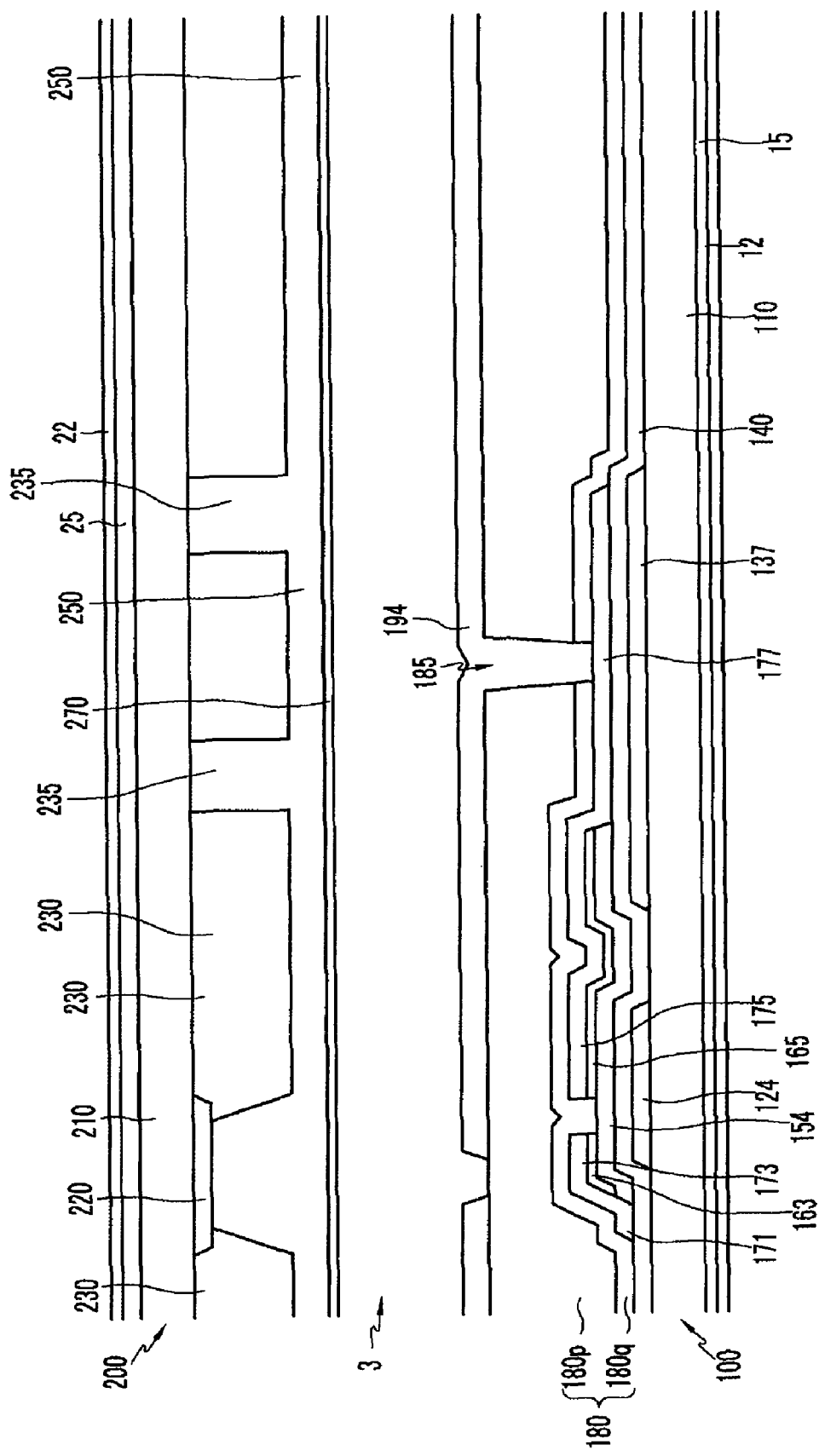
FIG. 17 and FIG. 18 are cross-sectional views taken along lines XVII-XVII and XVIII-XVIII of FIG. 16, respectively.
Figure 18:
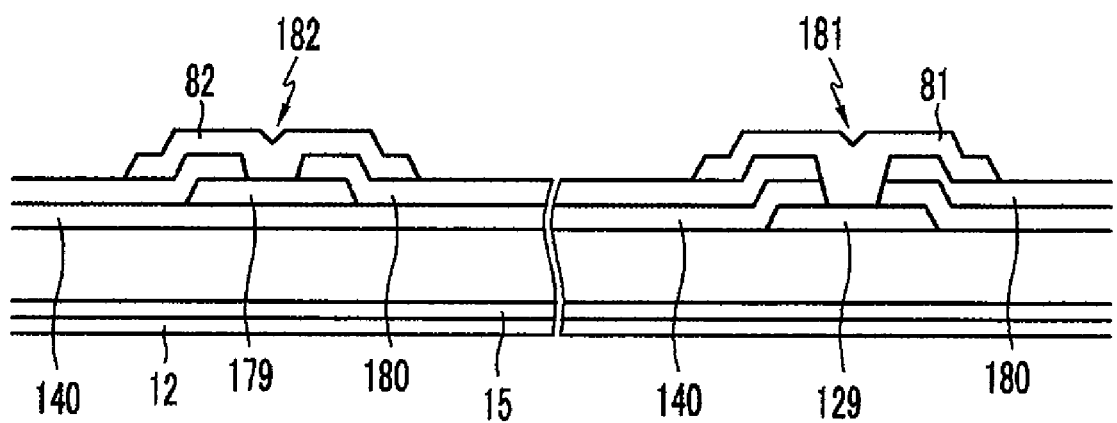

FIG. 16 is a layout showing a pixel of a reflective type liquid crystal display device according to an embodiment of the invention, and FIG. 17 and FIG. 18 are cross-sectional views taken along lines XVII-XVII and XVIII-XVIII of FIG. 16, respectively.

The liquid crystal display panel according to the embodiment of the invention includes a thin film transistor array panel 100, a color filter array panel 200, and a liquid crystal layer 3 interposed between the panels 100 and 200. The liquid crystal layer 3 contains liquid crystal molecules aligned vertical or horizontal to surfaces of the panels 100 and 200.

First, the thin film transistor array panel 100 is now described in detail.

A plurality of gate lines 121 and a plurality of storage electrode lines 131 are formed on an insulating substrate 110 made of, for example, a transparent glass or plastic.

The gate lines 121 transmit gate signals and substantially extend in the transverse direction.

The storage electrode lines 131 are supplied with a predetermined voltage 131 and substantially extend parallel to the gate lines 121. Each storage electrode line 131 is located between two gate lines 121 adjacent to each other so as to be closer to a lower gate line 121.

A gate insulating layer 140 made of a silicon nitride (SiNx) or silicon oxide (SiOx) is formed on the gate lines 121 and the storage electrode lines 131.

A plurality of linear semiconductor layers 151 made of hydrogenated amorphous silicon (hereinafter, the amorphous silicon referred to as "a-Si"), polysilicon or the like are formed on the gate insulating layer 140.

A plurality of linear-shaped and island-shaped ohmic contacts 161 and 165 are formed on the semiconductor layers 151. The ohmic contacts 161 and 165 may be made of silicide or n+hydrogenated a-Si heavily doped with n type impurity such as phosphorus.

A plurality of data lines 171 and a plurality of drain electrodes 175 are formed on the ohmic contacts 161 and 165 and the gate insulating layer 140.

The drain electrodes 175 are separated from the data lines 171 and face the source electrodes 173 with respect to the gate electrodes 124. Each drain electrode 175 has one expanded end and the other end of a bar shape. The expanded end overlaps the storage electrodes 137, and the bar-shaped end is partially surrounded by the source electrode 173.

One thin film transistor (TFT) includes one gate electrode 124, one source electrode 173, one drain electrode 175, and the projection 154 of the semiconductor layer 151. A channel of the thin film transistor is formed at the projection 154 between the source electrode 173 and the drain electrode 175.

A passivation layer 180 formed on the data lines 171, the drain electrodes 175, and the exposed portions of the semiconductor layer 151. The passivation layer 180 includes a lower layer 180q made of the inorganic insulating material such as a silicon nitride and silicon oxide and an upper layer 180p made of an organic insulating material.

Each reflective electrode 194 is formed at the upper surface of the upper passivation layer 180p and is made of a reflective metal, such as aluminum, silver, chrome, or alloy thereof.

The reflective electrode 194 covers most of the pixel area to reflect light entered from.

The reflective electrodes 194 are physically or chemically connected to the drain electrodes 175 through the contact holes 185 to receive the data voltages from the drain electrodes 175. The reflective electrodes 194 supplied with the data voltages generate electric fields in cooperation with a common electrode 270 of the color filter array panel 200 to which a common voltage is applied, thereby determining the direction of the liquid crystal molecules in the liquid crystal layer 3 between the two electrodes.

The reflective type liquid crystal display panel including the thin film transistor array panel 100, the color filter array panel 200, and the liquid crystal layer 3 includes a reflection area RA defined by the reflective electrode 194. In the reflection areas RA, light supplied through the upper surface of the LCD panel passes through the LC layer 3, and is then reflected by the reflective electrodes 194. After light is reflected, light passes through the LC layer 3 again and is then emitted at the upper surface of the LCD panel, thus providing the display. At this time, light is reflected and dispersed by refraction of the reflective electrode 194.

Hereinafter, the color filter array panel 200 will be described.

A light blocking member 220 is formed on the insulating substrate 210 made of, for example, the transparent glass or plastic. Light blocking members 220 called "black matrix"

define aperture regions facing the reflective electrodes 194 prevent light from leaking out through barriers between the reflective electrodes 194.

A plurality of color filters 230 are also formed on the substrate 210. Most color filters 230 are disposed within the aperture regions surrounded by the light blocking members 220. The color filters 230 extend along the reflective electrodes 194 in the vertical direction to form a stripe. Each color filter 230 may exhibit one of primary colors such as red, green, and blue colors.

The reflective type liquid crystal display device passes along twice the color filter 230 when light is entered into the color filter array panel 200 and is reflected from the color filter array panel. This is different to the typical transmissive type liquid crystal display device. Therefore, the color filter different to the color filter of the transmissive type liquid crystal display device may be formed.

That is, the aperture 235 is formed in the color filter 230 of the reflective type liquid crystal display device. The size and number of the apertures 235 are changed by kinds of light sources and colors of the color filters, and it will be described below. The color filter may be formed by using a substance having the color saturation different from that of the transmissive type liquid crystal display device without forming the aperture 235.

An overcoat 250 is formed on the color filters 230 and the light blocking member 220, and a common electrode 270 is formed on the overcoat 250. The common electrode 270 is preferably made of transparent conductive materials such as ITO and IZO.

An alignment layer (not shown) is applied to an inner surface of the array panels 100 and 200 so as to align the liquid crystal layer, and polarizers 12 and 22 and phase retardation films 15 and 25 are provided at an outer surface of the array panels 100 and 200, respectively. A λ/4 plate or λ/4 plate is preferably used for the phase retardation films 15 and 25, and the λ/4 plate and λ/2 plate may be used together.

The relationship according to types of light sources and the colors of the color filters in the reflective type liquid crystal display device by the light sources will be described with reference to FIG. 19 and FIG. 20.

Figure 19:
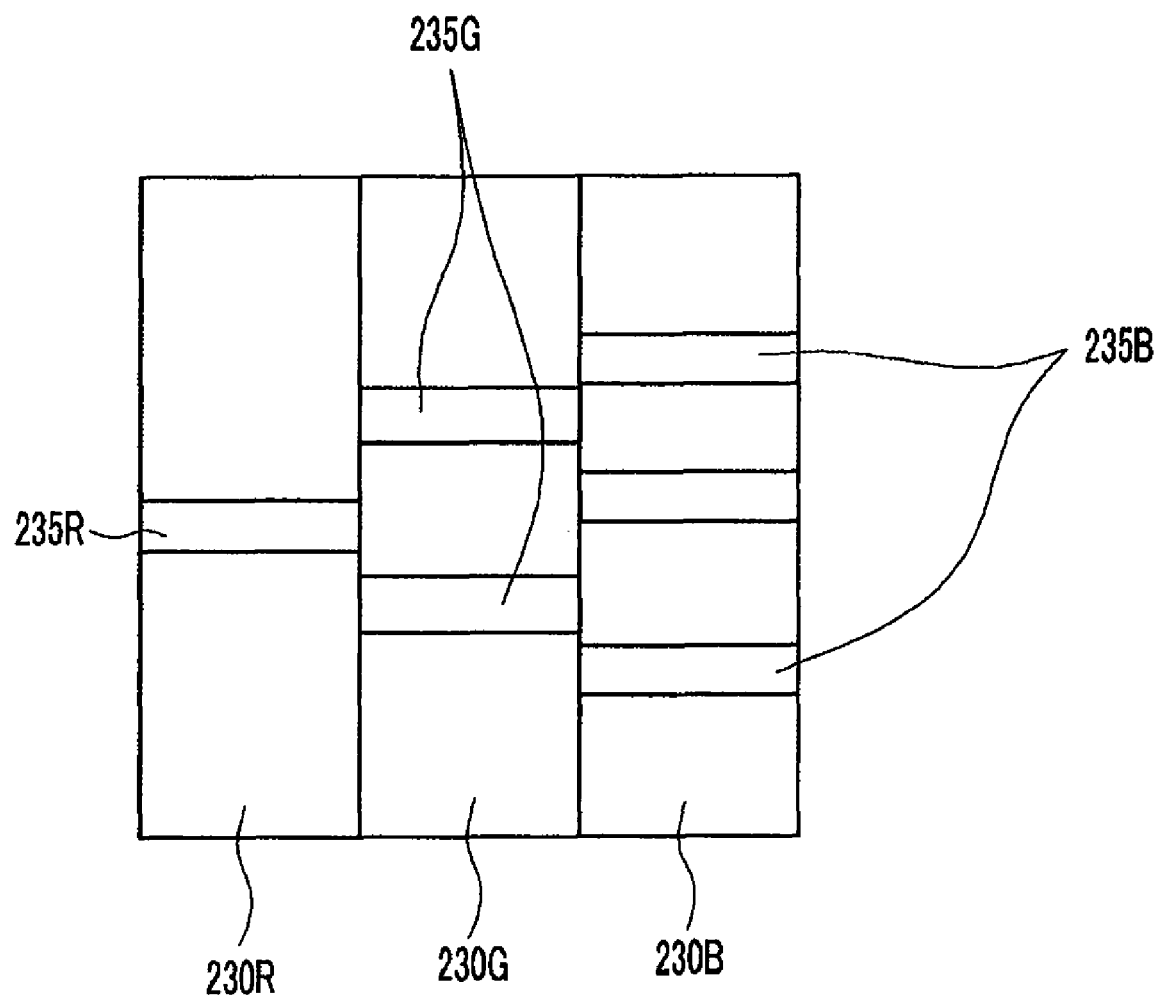
FIG. 19 is views showing color filters according to an embodiment of the invention using the light source of FIG. 6.
Figure 20:
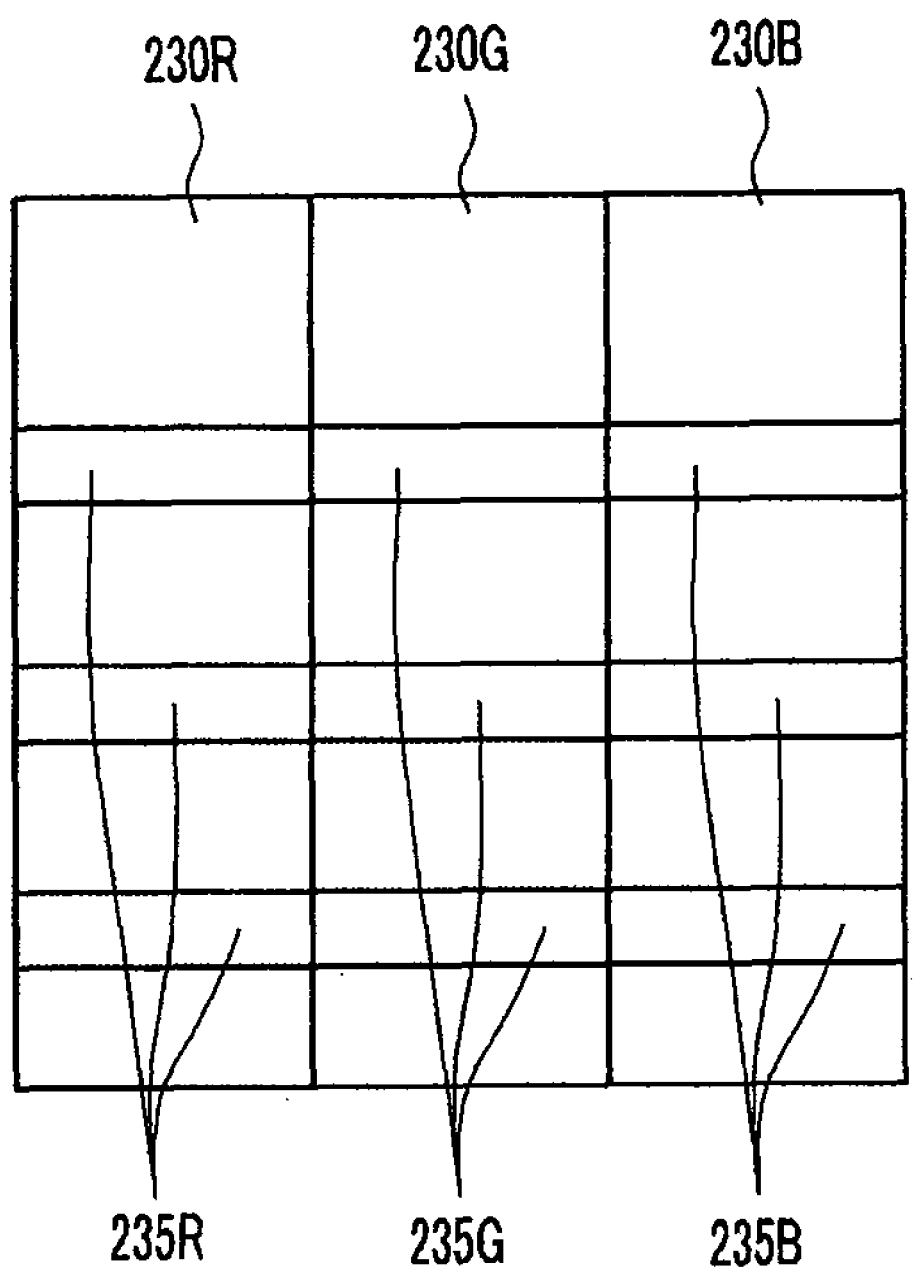
FIG. 20 is views showing color filters according to an embodiment of the invention using the light source of FIG. 10 or FIG. 14.

FIG. 19 is views showing color filter according to an embodiment of the invention using the light source of FIG. 6, and FIG. 20 is views showing color filter according to an embodiment of the invention using the light source of FIG. 10 or FIG. 14.

First, FIG. 19 shows an embodiment using the white LED module as a light source, FIG. 19 and an embodiment forming apertures in the color filter.

FIG. 19 is a view showing briefly the color filter. In FIG. 19, an entire area of the color filter is the reflection area using light to be reflected. As shown in FIG. 19, the reflection area RA includes the apertures 235 so as to adjust the color saturation. In case of using the white LED module, since blue color has the maximum distribution, the apertures 235 are formed so as to have the largest region within the blue color filter. In addition, the distribution of the green color is larger than that of the red color (see FIG. 6), the aperture 235 is formed such that the aperture 235 of the green color filter 235 is larger than the aperture 235 of the red color filter.

Meanwhile, FIG. 20 shows an embodiment using the red-green phosphor LED module as a light source. As shown in FIG. 20, the embodiment of the invention includes the apertures 235 so as to adjust the color saturation. In case of using the red-green phosphor LED module, since the distribution of the blue, green, and red colors harmonize with each other, the apertures having the same size are formed, thereby maintaining the balance of the color saturation.

FIG. 20 is applicable to the case using the red-green phosphor LED module and the case using the three-color LED module. However, if the color saturation is sufficiently exhibited by only three-color LED module, the apertures 235 may be formed on the entire pixels. That is, the color filter may be not formed.

In case of using the red-green phosphor LED module or the three-color LED module, the distribution of each color is harmonious with each other. However, since the difference of the color distribution is within the range of 20%, the difference of the color saturation increasing ratio may be within the range of 20% in each color.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the embodiment of the invention, the color filter is adjusted by the distribution of the colors included in the light source such that the color saturation of images displayed in the reflective mode is constant. As a result, the images are clearly exhibited in the liquid crystal display device, and resolution of the color increases. Moreover, it is possible to increase the display quality without an additional cost. Further and other embodiments will be apparent to those skilled in the art and may be created without, however, departing from the spirit and scope of the invention.

What is claimed is:

1. A liquid crystal display device comprising:
a front light unit including a light source;
a liquid crystal display panel that displays images by using light provided from the light source and is formed with color filters having an aperture, wherein the light source is a white LED module using a blue color LED and YAG, and
the size of the aperture is smaller in the order of the blue color filter, the green color filter, and the red color filter.

2. A liquid crystal display device comprising:
a front light unit including a light source;
a liquid crystal display panel that display images by using light provided from the light source and is formed with color filters having an aperture, wherein the light source is a red-green phosphor LED module forming red and green phosphors in addition to a white LED using a blue LED and YAG, and
the size difference between apertures formed in different color filters is within the range of 20%.

3. A liquid crystal display device comprising:
a front light unit including a light source;
a liquid crystal display panel that display images by using light provide from the light source and is formed with color filters having an aperture, wherein the light source is a three-color LED module using each LED that emits blue light, green light, and red light, and
the size difference between apertures formed in different color filters is within the range of 20%.

4. The liquid crystal display device of any one of claims 1, 2 and 3, wherein the liquid crystal display device uses reflected light to display images.

5. The liquid crystal display device of any one of claims 1, 2 and 3, wherein each color filter has a transmission area and a reflection area.

6. The liquid crystal display device of claim 2, wherein the color filter includes a reflection area, and
   the aperture of the reflection area is formed over the entire reflection area.

7. A liquid crystal display device comprising:
   a front light unit including a light source; and
   a liquid crystal display panel that displays images by using light provided from the light source and is formed with color filters having an aperture, wherein the light source is a white LED module using a blue color LED and YAG, and
   the color saturation increasing ratio increases in the order of the blue color filter, the green color filter, and the red color filter.

8. A liquid crystal display device comprising:
   a front light unit including a light source; and
   a liquid crystal display panel that displays images by using light provided from the light source and is formed with color filters having an aperture, wherein the light source is a red-green phosphor LED module forming red and green phosphors in addition to a white LED using a blue LED and YAG, and
   the difference between color saturation increasing ratios of different color filters is within the range of 20%.

9. A liquid crystal display device comprising:
   a front light unit including a light source; and
   a liquid crystal display panel that displays images by using light provided from the light source and is formed with color filters having an aperture, wherein the light source is a three-color LED module using each LED that emits blue light, green light, and red light, and
   the difference between color saturation increasing ratios of different color filters is within the range of 20%.

10. The liquid crystal display device of any one of claims 7, 8 and 9, wherein the liquid crystal display device uses reflected light to display images.

11. The liquid crystal display device of any one of claims 7, 8 and 9, wherein each color filter has a transmission area and a reflection area.

12. The liquid crystal display device of claim 11, wherein the material of the color filter in the transmission area is different from the material of the color filter in the reflection area.

13. The liquid crystal display device of claim 11, wherein the color filter in the reflection area has at least one aperture.

* * * * *